US012780144B2

(12) United States Patent
Saldana et al.

(10) Patent No.: US 12,780,144 B2
(45) Date of Patent: Nov. 3, 2026

(54) AUTO-IMMOBILIZATION BASED ON TAMPERING OR JAMMING DETECTION

(71) Applicant: Samsara Inc., San Francisco, CA (US)

(72) Inventors: Daniel Saldana, Billerica, MA (US); Eric Greenwald, Littleton, CO (US); Xin Yang, Oakland, CA (US); James Rhett Aultman, Stone Mountain, GA (US); Oleksandr Zhevzhyk, London (GB); Esteban Bucio Betancourt, Toronto (CA); Brendan Donecker, Oakland, CA (US); Abrahm Scully, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 46 days.

(21) Appl. No.: 18/956,317

(22) Filed: Nov. 22, 2024

(65) Prior Publication Data

US 2026/0061966 A1 Mar. 5, 2026

Related U.S. Application Data

(63) Continuation of application No. 18/746,645, filed on Jun. 18, 2024, now Pat. No. 12,179,697.

(51) Int. Cl.
*B60R 25/045* (2013.01)
*B60R 25/30* (2013.01)
(Continued)

(52) U.S. Cl.
CPC .......... *B60R 25/045* (2013.01); *B60R 25/305* (2013.01); *B60R 25/33* (2013.01); *G01S 19/396* (2019.08)

(58) Field of Classification Search
CPC ......... B60R 25/33; B60R 25/04; H04W 4/029
See application file for complete search history.

(56) References Cited

U.S. PATENT DOCUMENTS 6,429,768 B1 * 8/2002 Flick ........................ H04K 3/92 340/5.31
12,179,697 B1 12/2024 Saldana et al.
(Continued)

OTHER PUBLICATIONS

"Mexican Application Serial No. MX a 2024 008516, Office Action mailed Jul. 17, 2024", 2 pgs.
(Continued)

*Primary Examiner* — Tan Q Nguyen
(74) *Attorney, Agent, or Firm* — Schwegman Lundberg & Woessner, P.A.

(57) ABSTRACT

Methods, systems, and computer programs are presented for immobilizing a vehicle based on the detection of threats, such as tampering or jamming. The method includes configuring a vehicle for tamper and jamming detection, installing a communication device and an engine immobilizer in the vehicle, and providing a user interface for configuring the communication device to activate the engine immobilizer. The method further includes parallel paths for tampering detection, which immobilizes the vehicle and notifies the server upon detection, and for jamming detection, which similarly immobilizes the vehicle and notifies the server, including the vehicle's GPS position. Optionally, image information from the vehicle may be included in the notification or to trigger immobilization upon detecting multiple occupants, indicating a potential carjacking. This solution enables fleet managers to react to thefts and maximize vehicle recovery rates quickly.

20 Claims, 15 Drawing Sheets

(51) Int. Cl.

| | |
|---|---|
| ***B60R 25/33*** | (2013.01) |
| *G01S 19/39* | (2010.01) |
| *H04W 4/029* | (2018.01) |

(56) References Cited

U.S. PATENT DOCUMENTS

| | | | | |
|---|---|---|---|---|
| 2003/0218382 | A1* | 11/2003 | Simon | B60R 25/04 307/10.2 |
| 2006/0265128 | A1* | 11/2006 | Miller | G01C 21/30 701/2 |
| 2007/0200688 | A1* | 8/2007 | Tang | B60R 25/04 455/1 |
| 2010/0052882 | A1* | 3/2010 | Sverrisson | B60R 25/10 701/1 |
| 2017/0240137 | A1* | 8/2017 | Morgan | B60R 25/1012 |
| 2020/0216022 | A1* | 7/2020 | Cheng | H04W 4/40 |
| 2023/0396611 | A1 | 12/2023 | Sarkar et al. | |

OTHER PUBLICATIONS

"U.S. Appl. No. 18/746,645, Notice of Allowance mailed Aug. 28, 2024", 8 pgs.

"Mexican Application Serial No. MX a 2024 008516, Response filed Sep. 23, 2024 to Office Action mailed Jul. 17, 2024", With English Machine Translation, 15 pgs.

* cited by examiner

AUTO-IMMOBILIZATION BASED ON TAMPERING OR JAMMING DETECTION

CROSS-REFERENCE TO RELATED APPLICATIONS

This application is a Continuation Application under 35 USC § 120 of U.S. patent application Ser. No. 18/746,645, entitled "Auto-Immobilization Based on Tampering or Jamming Detection," filed on Jun. 18, 2024, and is herein incorporated by reference in its entirety.

TECHNICAL FIELD

The subject matter disclosed herein generally relates to methods, systems, and machine-readable storage media for vehicle safety technologies, including methods, systems, and machine-readable storage media for vehicle security.

BACKGROUND

The methods employed by individuals with nefarious intent to gain unauthorized entry into vehicles are manifold and continually evolving. The problem is how to reduce incidents involving the unlawful appropriation of vehicles and the subsequent loss of assets. From the standpoint of a manager in charge of a fleet of vehicles, protecting the vehicles represents a significant concern, as the frequency of vehicle theft has shown a marked increase. These methods range from the use of physical force to compromise vehicle locks to the exploitation of technological vulnerabilities within the vehicle's electronic systems.

What are needed are methods to detect threats to the possession of the vehicle and the implementation of measures to protect the vehicles.

BRIEF DESCRIPTION OF THE DRAWINGS

Various appended drawings illustrate examples of the present disclosure and cannot be considered limiting its scope.

DETAILED DESCRIPTION

Figure 1:
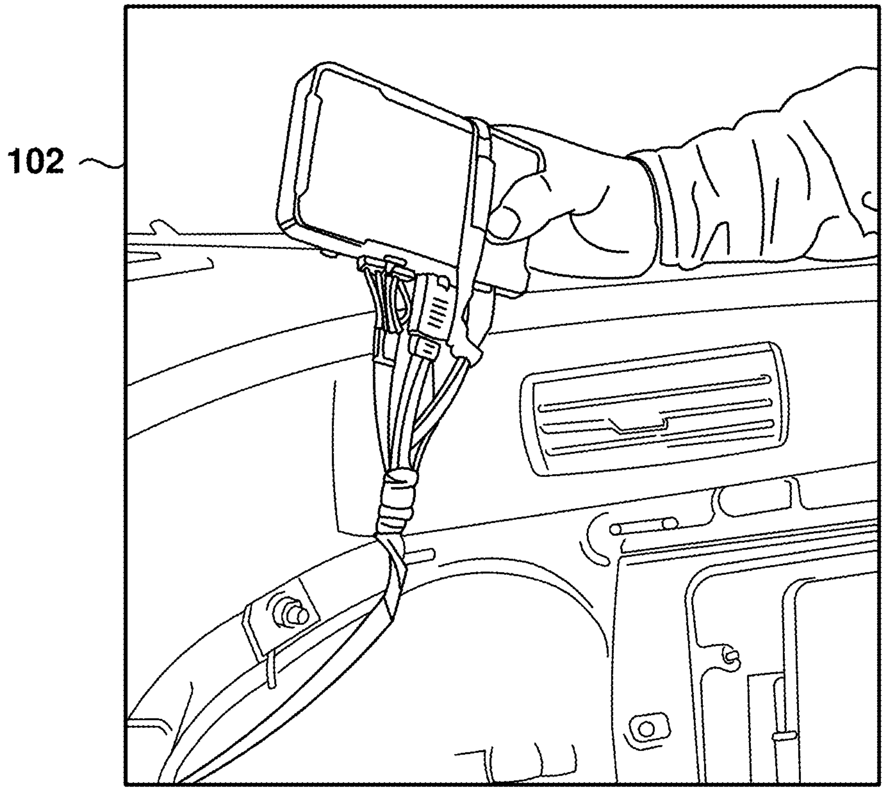
FIG. 1 is an image illustrating the installation of safety and monitoring equipment in a vehicle, according to some examples.

Example methods, systems, and computer programs are directed at immobilizing a vehicle based on the detection of threats. Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

The present techniques relate to a security system that detects tampering and jamming events in a vehicle. According to certain examples, tampering may refer to unauthorized manipulation or interference with the vehicle's hardware or software systems, such as the removal of the dashboard cover to access internal components or unauthorized attempts to disable the vehicle's tracking device. An example of tampering includes a scenario where an intruder attempts to disconnect the vehicle's communication device to prevent it from sending location data. On the other hand, jamming may include deliberate interference with the communication and signal reception capabilities of the vehicle, typically through the use of devices that emit signals to block or disrupt the vehicle's GPS or cellular connections. An example of jamming is the use of a GPS jammer to prevent the vehicle from accurately reporting its location, potentially facilitating theft or unauthorized use. The disclosed security system considers various scenarios involving customizable logic for activating safety mechanisms in the vehicle. For instance, in one scenario, the vehicle's speed is a safety concern, and immobilization should not occur unless the vehicle's speed is zero or very low.

Upon detecting jamming, the system will immobilize the accelerator of the vehicle after a wait period. If tampering is detected, the vehicle may be immobilized immediately. This wait time reduces false positives due to signal interference that may be misinterpreted as jamming.

After the vehicle reaches a safe speed, both the ignition and the accelerator are disabled to immobilize the vehicle. In some examples, a one-time passcode may be used to remobilize the vehicle, or an override command from the driver app to the communication device may be used to remobilize the vehicle in signal-less zones.

Additionally, if tampering is detected, such as the removal of the dashboard cover, the system will immobilize the accelerator immediately. A communication device in the vehicle recognizes the comprising conditions and autonomously triggers a command to the engine immobilizer to open its relays, immobilizing the vehicle without human input.

Auto-mobilization may be inadequate in certain situations, such as when the vehicle stops at a toll booth or checkpoint. To address this, some examples provide a snooze option to delay immobilization temporarily. For example, the snooze option may temporarily suspend the auto-immobilization process, giving the driver or authorized personnel the ability to override the system's automatic response under specific circumstances. This feature is particularly useful in scenarios where immobilization could lead to unintended consequences or disruptions, such as blocking traffic at a toll booth or causing delays at security checkpoints.

For instance, if a vehicle equipped with this security system stops at a toll booth and the system detects conditions that would normally trigger immobilization, the snooze option may allow the driver to delay this action. The driver can activate the snooze feature through a user interface, such as a button on the dashboard or a command on a mobile app associated with the vehicle's security system. Once activated, the snooze option can postpone the immobilization for a predefined period, say 5 to 10 minutes, allowing the vehicle to clear the sensitive area safely.

In some examples, the snooze option may be configurable by the fleet manager or vehicle owner through the security system settings. They can set the duration of the snooze period and specify the conditions under which the snooze option is available. This customization ensures that the feature is used effectively and responsibly, balancing security needs with operational practicality.

FIG. 1 is an image 102 illustrating the installation of safety and monitoring equipment in a vehicle, according to some examples. In this example, a safety device (e.g., comm device 402 described in more detail below) is being installed in a vehicle behind the dashboard.

To install the safety device, the dashboard cover is removed, the appropriate wires (e.g., power, diagnostic port, cam device) are connected, and then the cover is replaced. In some examples, an engine immobilizer (not shown) is also installed and connected to the security device. The engine immobilizer enables immobilization of the vehicle and, when connected to the security device, enables autonomous, automatic immobilization in response to predefined situations or events. In some examples, a USB connection is used between the safety device and the engine immobilizer, but other types of electronic connections may be used.

To defend against tampering, jamming, or other dangerous events, the engine immobilizer incorporates a magnet that, upon installation, is positioned in a manner that ensures the closure of circuits and relays when the dashboard is in place on the vehicle. This configuration allows for the recognition of normal operational status.

If the magnets get disconnected, this is a sign of tampering by somebody removing the dashboard in order to take out the safety device. Malicious persons who want to steal the vehicle or move the vehicle somewhere else to steal the cargo know about the safety devices that can track the location of the vehicle, so it is often their goal to remove the safety device and stop the vehicle from communicating position to the monitoring station. By detecting the tampering of the dashboard, the safety device may take defensive measures, such as disabling the engine with the engine immobilizer.

Figure 2:
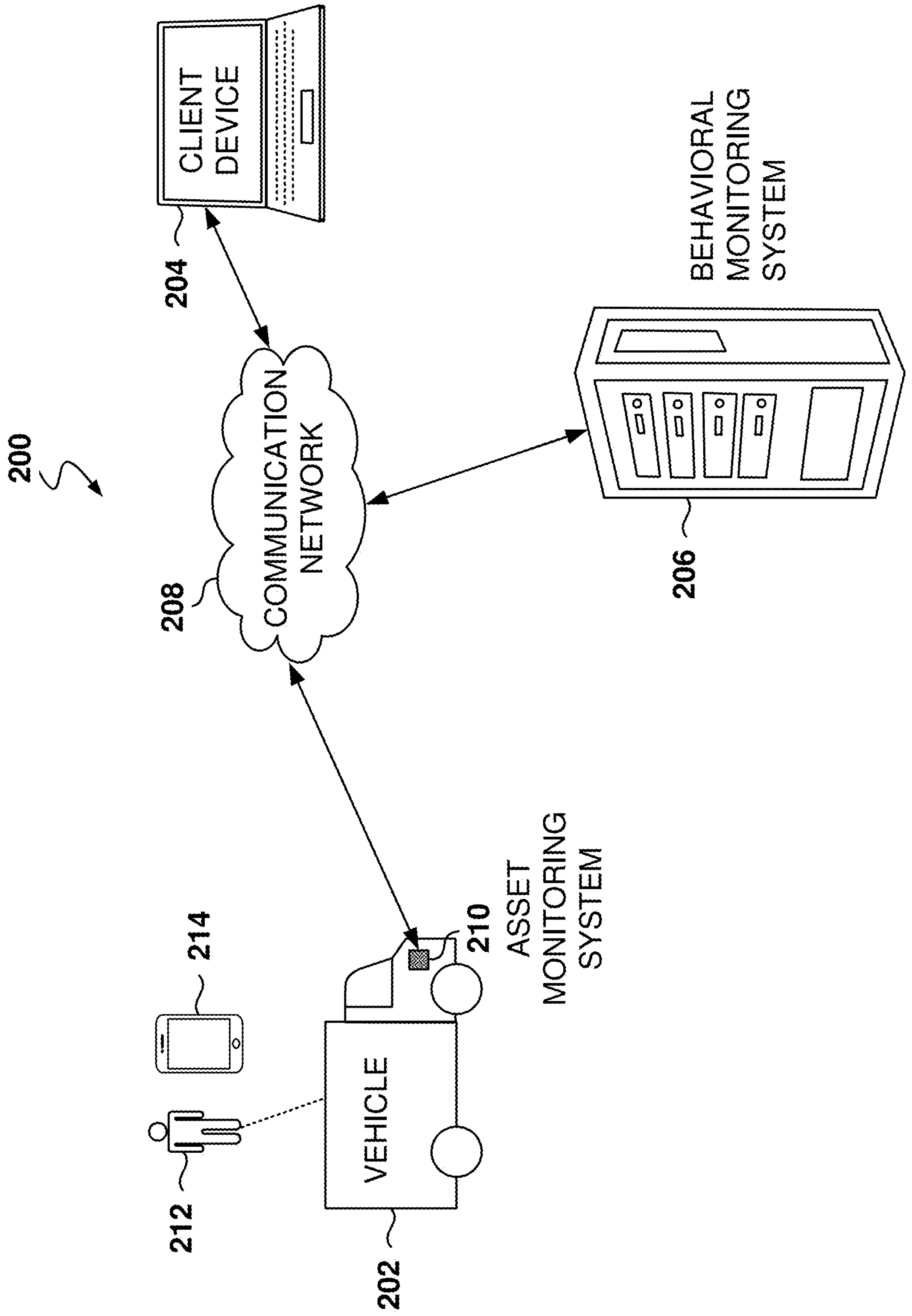
FIG. 2 shows a system for vehicle rider behavioral monitoring, according to some examples.

FIG. 2 shows a system 200 for vehicle rider behavioral monitoring, according to some examples. As shown, multiple devices (e.g., vehicle 202, client device 204, and behavioral monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof. The communication network 208 is implemented using any number of communication links associated with one or more service providers, including one or more wired communication links, one or more wireless communication links, or any combination thereof.

The vehicle 202 may be any type of vehicle or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers) and assets that are controlled remotely (e.g., drones, air traffic controllers). The examples described herein should therefore not be interpreted to be exclusive or limiting, but rather illustrative.

As shown, the vehicle 202 includes an asset monitoring system (AMS) 210 that allows for monitoring events at the vehicle and exchanging information and commands between the vehicle 202 and one or more remote computing devices via the communication network 208.

The asset monitoring system 210 may include one or more hardware devices to perform monitoring functions at the vehicle, such as a communications device and a camera device, but other configurations are also possible.

The asset monitoring system 210 allows the vehicle 202 to transmit data, such as sensor data gathered by sensors in the vehicle 202, to a remote computing device. The vehicle 202 may be equipped with a variety of sensors that capture data describing the performance of the vehicle 202, actions performed by riders in and around the vehicle 202, and the vehicle's surrounding environment.

The behavioral monitoring system 206 is a computing system consisting of one or more computing devices configured to provide remote behavioral monitoring of a vehicle 202 to detect different conditions of driver state and execute corresponding responses. For example, the behavioral monitoring system 206 may allow a user, such as a fleet manager administrator, to define a set of triggering conditions and criteria for detecting and responding to undesirable behavior or dangerous conditions.

To utilize the functionality of the behavioral monitoring system 206, users (e.g., administrators and fleet managers) may use the client device 204. Although the shown system 200 includes only one client device 204 and one vehicle 202, this is only for ease of explanation and is not meant to be limiting. One skilled in the art would appreciate that the system 200 could include any number of client devices 204 and vehicles 202. Further, the behavioral monitoring system 206 may concurrently accept communications from and initiate communication messages and interact with any number of client devices 204 and vehicles 202, and support connections from a variety of different types of client devices 204.

A user may interact with the behavioral monitoring system 206 via a client-side application installed on the client device 204. In some examples, the client-side application includes a component specific to the behavioral monitoring system 206. For example, the component may be a standalone application, one or more application plug-ins, or a browser extension. However, the users may also interact with the behavioral monitoring system 206 via a third-party application, such as a web browser or messaging application, that resides on the client device 204 and is configured to communicate with the behavioral monitoring system 206. In either case, the client-side application presents a user interface (UI) for the user to interact with the behavioral monitoring system 206.

The behavioral monitoring system 206 may provide a user interface that allows administrators to configure the triggering conditions. Each triggering condition defines one or more individual conditions that, if satisfied, indicates the occurrence of an undesirable behavior or a critical event such as a collision. For example, a triggering condition may define one or more terms or a string of terms that, if spoken, indicate the use of offensive, derogatory, and otherwise undesirable language. As another example, a triggering condition may define unsafe lane-departure events.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent. Similarly, the user interface enables the administrator to define actions for generating an incident report based on the detected occurrence of undesirable behavior.

Further, a driver 212 may interact with the behavioral monitoring system 206 and the AMS 210 via a mobile device 214. A BMS app may execute on the mobile device 214 and connect (e.g., via wireless communication such as cellular, WiFi, or Bluetooth) to the AMS 210 and the behavioral monitoring system 206 to perform operations related to the BMS, such as getting information for a trip, receiving feedback regarding in-vehicle behavior, attend training, etc. Alternatively, the driver 212 may access the same functionality via a web browser executing on the mobile device 214.

Figure 3:
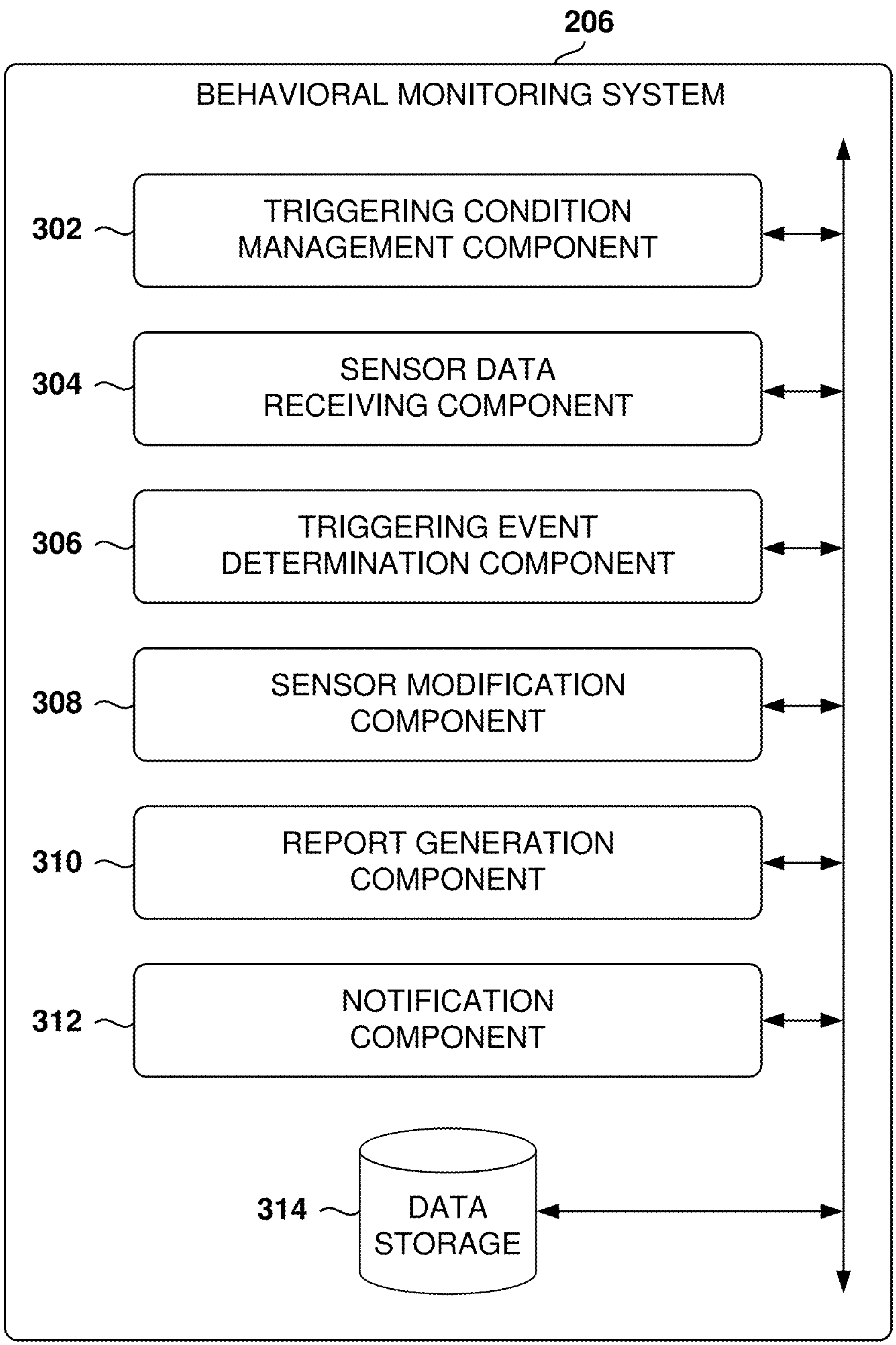
FIG. 3 is a block diagram of a Behavioral Monitoring System (BMS), according to some examples.

FIG. 3 is a block diagram of a behavioral monitoring system 206 (BMS), according to some examples. To avoid obscuring the inventive subject matter with unnecessary detail, various functional components (e.g., modules) that are not germane to conveying an understanding of the inventive subject matter have been omitted from FIG. 3. The various functional components depicted in FIG. 3 may reside on a single computing device or may be distributed across several computing devices in various arrangements, such as those used in cloud-based architectures.

The behavioral monitoring system 206 includes a triggering condition management component 302, a sensor data receiving component 304, a triggering event determination component 306, a sensor modification component 308, a report-generation component 310, a notification component 312, and a data storage 314.

The triggering condition management component 302 facilitates the generation and modification of triggering conditions. For example, triggering condition management component 302 provides a graphical user interface that allows administrators to generate and modify triggering conditions. Each triggering condition defines one or more individual conditions that, if satisfied, indicates the occurrence of an undesirable behavior, as well as a corresponding set of response actions to be performed if the triggering condition has been satisfied. The user interface provided by the triggering condition management component 302 enables administrators to define the triggering conditions. Triggering conditions may include any one or combination of specific criteria or parameters that, when met or surpassed, prompts a predetermined or user-defined response within the system. For example, such conditions can include: thresholds; the detection of image features from camera feeds; anomalies in sensor data, such as irregular steering or braking patterns; behavioral patterns, including, for example, a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition has been triggered. In some examples, the triggering condition management component 302 stores the generated triggering conditions in the data storage 314. The stored triggering conditions may be associated with an account and fleet identifier that identifies the account, vehicle fleet, or vehicles to which the triggering conditions are associated.

The sensor data receiving component 304 receives sensor data from the vehicles 202, including data from the sensors in the AMS 210. The sensor data receiving component 304 provides the sensor data to the other components of the behavioral monitoring system 206 for use in detecting the occurrence of undesirable behavior. The sensor data receiving component 304 may also store the sensor data in the data storage 314, where it may be accessed by the other components of the behavioral monitoring system 206. For example, the stored sensor data may be associated with a unique identifier associated with the vehicle 202 from which the sensor data was received. The sensor data may also include timestamp data indicating the time at which the sensor data was captured by the sensors of the vehicle 202 or when the sensor data was received by the behavioral monitoring system 206.

The triggering event determination component 306 uses the sensor data received by the sensor data receiving component 304 to determine whether any of the triggering conditions have been satisfied. In some examples, a triggering condition may be based on a combination of individual conditions, such as a combination of detecting specified terms, detecting specified motions, or detecting a specified volume level. In these types of examples, the triggering event determination component 306 may use the sensor data to determine that each of the individual conditions has been satisfied within a predetermined time window, such as within a five-second window. For example, the triggering event determination component 306 may use timestamp data associated with the sensor data to determine whether each of the individual conditions was satisfied within the predetermined time window. Accordingly, the triggering condition is satisfied when each of the individual conditions occurs within the predetermined time window.

The triggering event determination component 306 notifies the other components of the behavioral monitoring system 206 if a triggering condition has been triggered.

The sensor modification component 308 modifies the operating mode of sensors in the vehicle 202. In some cases, an administrator or fleet manager may wish to capture additional or higher-quality sensor data to document a detected incident of undesirable behavior. For example, the administrator or fleet manager may wish to initiate the use of sensors, such as cameras, microphones, or other sensor devices, to capture sensor data and document the incident.

The report-generation component 310 generates an incident report to document a detected occurrence of undesirable behavior. The incident report may include any of a variety of data defined by an administrator in a triggering condition. For example, an incident report may include data identifying the vehicle 202, the driver of the vehicle, the time of the incident, the action that satisfied the triggering condition (e.g., lane departure, tampering, driving while drowsy, etc.), as well as captured sensor data depicting the incident. The report-generation component 310 may store the incident report in the data storage 314, where an administrator or other authorized user may access it.

The notification component 312 generates and transmits a notification to users defined by the triggering condition. For example, the notification component 312 identifies a contact identifier corresponding to the triggering event. An administrator may define the contact identifier when generating the triggering event. The contact identifier provides contact details for reaching a user designated to receive a notification when the triggering event is triggered. For example, the contact identifier may be an email address, phone number, and the like.

The notification component 312 may then transmit a notification directed to the content identifier. The notification may provide details of the detected incident, such as a description of the undesirable behavior, time, associated vehicle 202, and the like. The notification may also enable a user to access an incident report associated with the detected incident.

Figure 4:
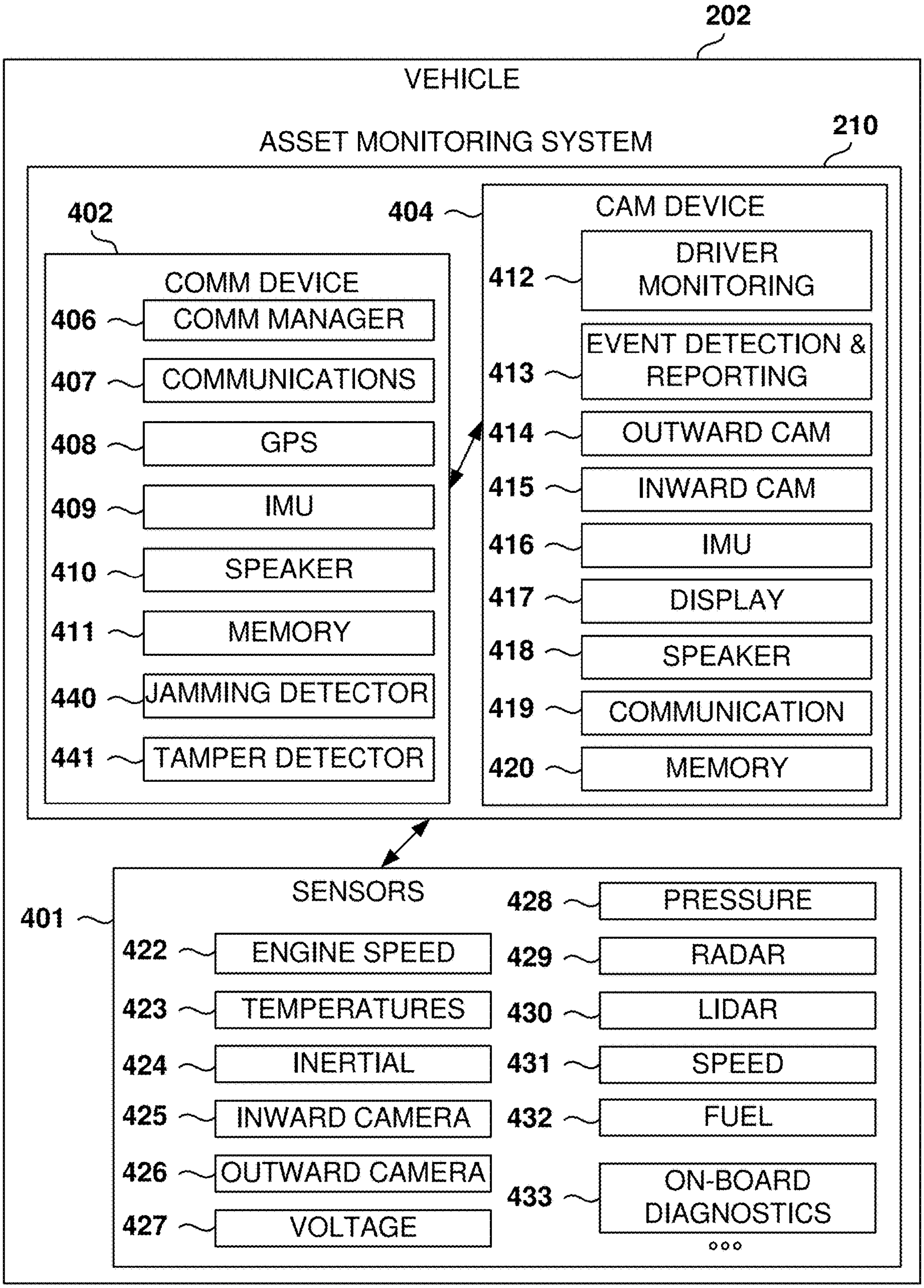
FIG. 4 illustrates the components of a vehicle for rider behavioral monitoring, according to some examples.

FIG. 4 illustrates components of a vehicle 202 for rider behavioral monitoring, according to some examples. The vehicle 202 includes the asset monitoring system 210 and a plurality of sensors 401. The AMS 210 may include a single device or distribute its functions across a plurality of devices in the vehicle (e.g., sensors, processors, communications devices) that are able to communicate among themselves. In the illustrated example, the AMS 210 includes a comm device 402 and a cam device 404, but other examples may utilize different numbers of devices or distribute their functionality differently.

The comm device 402 provides communication services within the vehicle and the network and may connect to the diagnostic port in the vehicle to gather vehicle information. In some examples, the comm device 402 includes a communications manager 406, a communications module 407, a Global Positioning System (GPS) 408, an Inertial Measurement Unit (IMU) 409, a speaker 410, computer memory 411 (RAM and permanent storage), a jamming detector 440, a tamper detector 441, and one or more processors (not shown). The GPS 408 and the IMU 409 may be used, together or separately, to calculate the speed of the vehicle.

The communications manager 406 coordinates communications with the BMS and other devices in the vehicle, such as the cam device 404. The communications module 407 provides one or more communication interfaces, such as mobile telephony, satellite communications, WiFi, Bluetooth, etc. Further, the communications manager 406 may provide a WiFi hotspot to other devices in the vehicle so these devices can communicate to the network via the WiFi hotspot.

The IMU 409 sensor detects the motion and orientation of the vehicle, and the memory 411 stores data collected during the operation of the vehicle and programs that may be executed on the comm device 402.

The jamming detector 440 detects when the electronic signals (e.g., Global Positioning System (GPS)) to the vehicle are being jammed, such as by utilizing a GPS jammer. The GPS jammer is a device that disrupts or interferes with the signals from GPS satellites by emitting radio frequency signals that can overwhelm the GPS signals, making it difficult or impossible for GPS receivers to determine their location accurately. The GPS jammers may use interference to broadcast signals at the same frequency as GPS satellites, which can overpower the weak signals from space. This interference can cause the GPS receiver to lose its lock on the satellite signals, rendering it unable to calculate its position. The GPS jammers may also use jamming signals that are stronger than the GPS signals, which are already very weak when they reach the Earth's surface.

The tamper detector 441 is for detecting tampering, such as when the dashboard cover is being removed. An example tamper detector 441 is described in more detail below with reference to FIG. 6.

In some examples, the cam device 404 includes a driver monitoring 412 module, an event detection and reporting system 413, an outward camera 414 that captures images in the direction of travel, an inward camera 415 that captures images of the vehicle cabin, an IMU 416, a display 417 (e.g., a touchscreen, computer display, LED lights), a speaker 418, a communications module 419, a memory 420, and a processor (not shown). The inward camera 415 is installed within the vehicle cabin to monitor the driver and passengers, while the outward camera 414 provides visual information about the environment surrounding the vehicle.

The driver monitoring 412 module performs one or more activities regarding driver behavior, such as LD detection, driving while drowsy, following too close, sudden breaking, etc. The event detection and reporting system 413 is configured to identify and log significant events based on sensor data. The display 417 provides visual feedback and information to the vehicle occupants, while the speaker 418 provides auditory information or alerts. Further, the memory 420 stores data collected during the operation of the vehicle and programs that may be executed on the cam device 404.

In some examples, the cam device 404 is configured to execute the machine learning models described, but other examples may execute the machine learning models in the comm device 402. Other configurations may include additional devices within the AMS 210 or consolidate all functions within a single device.

In some examples, the comm device 402 and the cam device 404 are connected via a hardwire connection (e.g., USB), and the cam device 404 may be powered via this hardwire connection. In some examples, the comm device 402 draws power from the vehicle's electrical system. Further, the AMS may include other sensors, such as any of the sensors 401. The AMS 210 is configured to communicate with any of the sensors 401 in the vehicle.

The sensors 401 are configured to monitor various parameters and states of the vehicle. In some examples, the sensors 401 include an engine speed sensor 422 that measures the revolutions per minute of the engine, temperature sensors 423 that measure various temperature points in the vehicle (e.g., cabin, engine, outside), and inertial sensors 424 that detect motion and orientation of the vehicle. The sensors 401 may also include an inward camera 425, an outward camera 426, a voltage sensor 427 that monitors the electrical system of the vehicle, and pressure sensors 428, which detect the pressure in various systems such as tires or hydraulic systems. Further, the sensors 401 may include radar sensors 429 and Light Detection and Ranging (LIDAR) sensors 430, which provide distance and mapping capabilities for the vehicle's surroundings. A speed sensor 431 measures the traveling speed of the vehicle, and fuel sensors 432 monitor the amount of fuel in the tank. The vehicle may also include an on-board diagnostics system 433 for self-diagnosis and reporting of the operational status of the vehicle 202.

Figure 5:
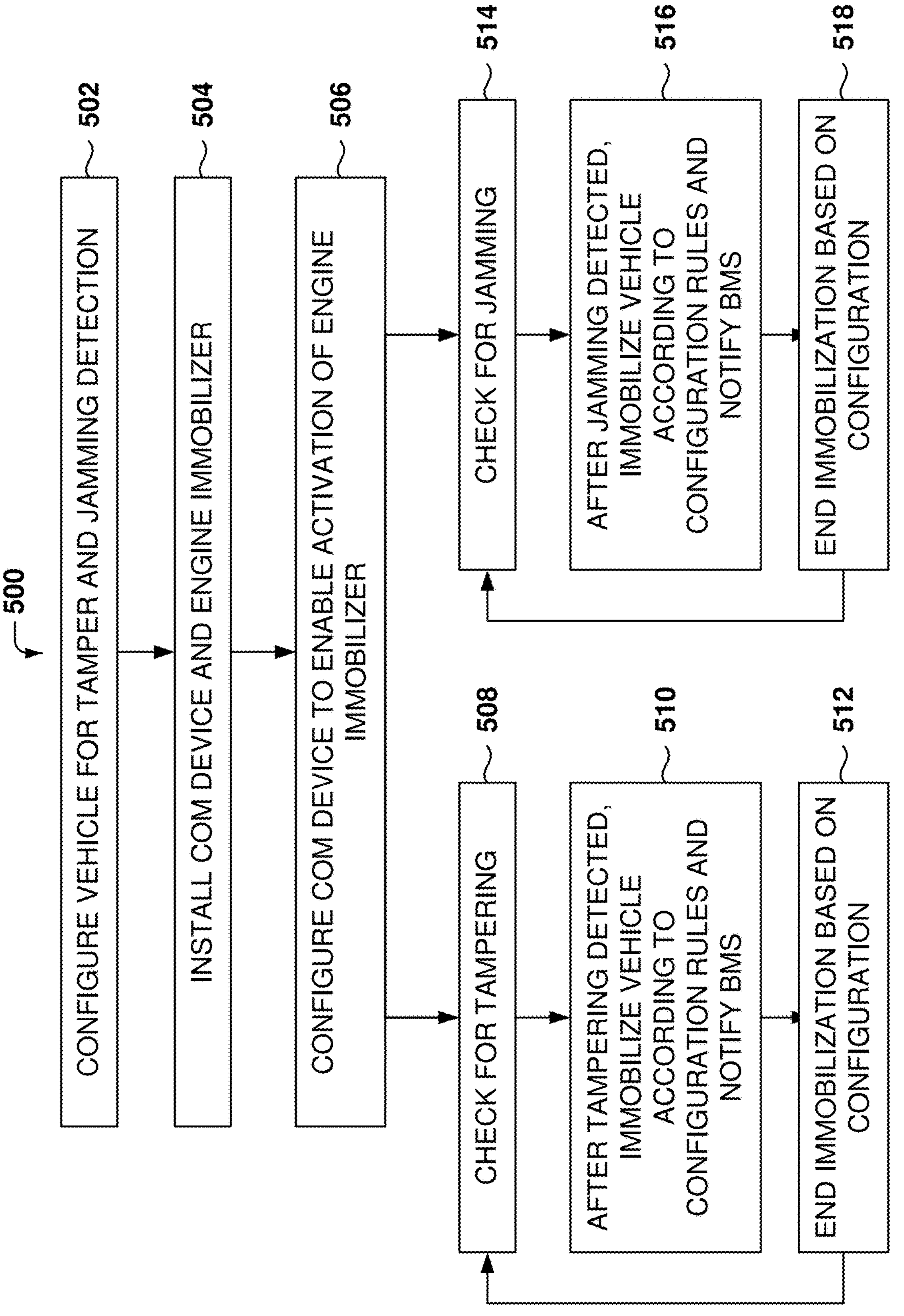
FIG. 5 is a flowchart of a method for auto-immobilization based on tampering or jamming detection, according to some examples.

FIG. 5 is a flowchart of a method 500 for auto-immobilization based on tampering or jamming detection, according to some examples. While the various operations in this flowchart are presented and described sequentially, one of ordinary skill will appreciate that some or all of the operations may be executed in a different order, be combined or omitted, or be executed in parallel.

Some fleet managers struggle with the impact of vehicle thefts and hijackings for the proper operation of their vehicles. It would be beneficial to react to thefts as quickly as possible and maximize their vehicle recovery rate. To accomplish this, logic is added to the com device to immobilize vehicles automatically when tampering is detected. With this feature enabled, immobilization occurs quickly, making it possible to deter thieves from active theft situations.

Operation 502 involves configuring the vehicle for tamper and jamming detection. This operation establishes the necessary parameters and detection capabilities within the vehicle's system, setting the foundation for the subsequent auto-immobilization process.

From operation 502, the method 500 flows to operation 504, where the com device and the engine immobilizer are installed in the vehicle. For example, the com device is installed behind the vehicle's dashboard, the engine immobilizer is placed in a secure location within the vehicle, and the proper connection is tested. In some examples, a tamper switch (e.g., magnetic component) of the immobilizer is installed in a way that ensures circuit closure when the dashboard cover is installed correctly.

Next, operation 506 is for providing a user interface (UI) to configure the com device to enable the activation of the engine immobilizer. For example, the UI provides options for users to adjust speed thresholds and relay activation sequences. A configuration UI is described below with reference to FIG. 13.

The method 500 then diverges into two parallel paths: one for tampering detection and one for jamming detection. Operation 508 checks for tampering. If tampering is detected, the method proceeds to operation 510, where the vehicle is immobilized according to the predefined configuration rules, and the BMS is notified of the event.

From operation 510, the method 500 flows to operation 512 for ending the immobilization process based on the configuration parameters, which may involve certain conditions or criteria being met to restore the vehicle's functionality (e.g., receiving a remote command to remobilize the vehicle). From operation 512, the method 500 flows back to operation 508 to continue checking for tampering.

Operation 514 checks for jamming. Upon detecting jamming, the method 500 moves to operation 516, which, similar to operation 510, immobilizes the vehicle based on the configuration rules for jamming and notifies the BMS of the immobilization of the vehicle, as well as other optional information about the vehicle, such as the GPS position.

Jamming may occur without malicious intent, such as at security checkpoints, military zones, or prison sites. For these cases, the configuration parameters will disable immobilization to avoid immobilization near sensitive sites where jamming may be legal.

From operation 516, the method 500 flows to operation 518 for ending the immobilization process based on the configuration parameters, which may involve certain conditions or criteria being met to restore the vehicle's functionality (e.g., receiving a remote command to remobilize the vehicle). From operation 516, the method 500 flows back to operation 514 to continue checking for tampering.

In some examples, if the cam device is installed in the vehicle, image information may also be used. For example, if jamming or tampering is detected, the notification to the BMS may include images from the inside and the outside of the vehicle.

In some examples, image information may also be used to trigger immobilization, such as when more than one person is detected in the cabin (or more than two people), which may be an indication of a carjacking.

Figure 6:
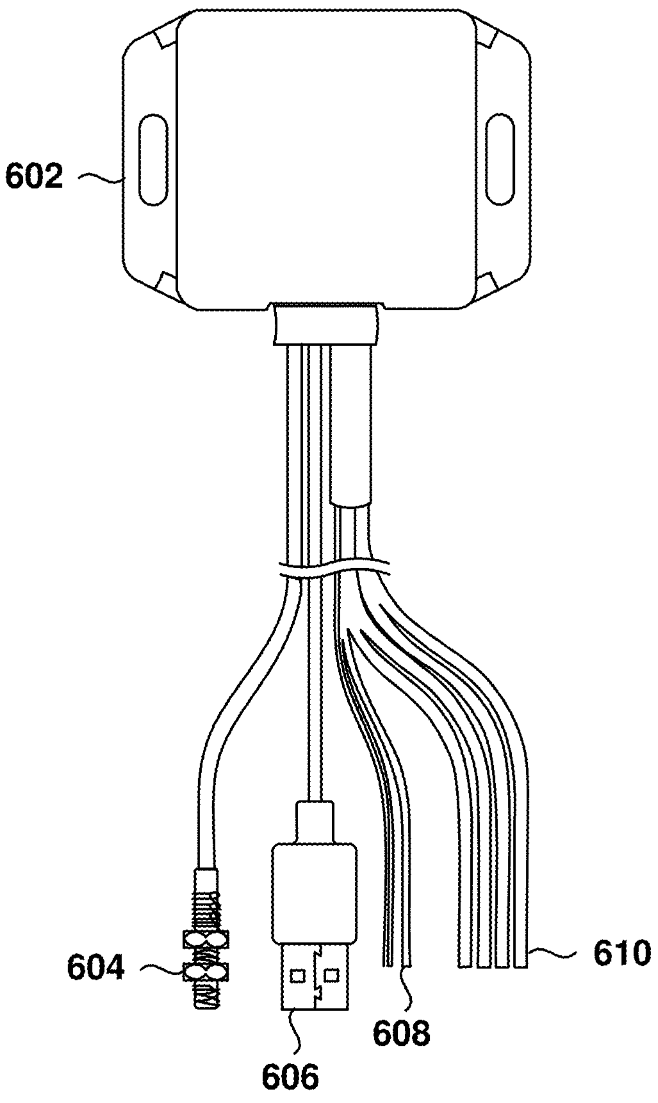
FIG. 6 shows an example of an engine immobilizer.

FIG. 6 shows an example of the engine immobilizer 602. The engine immobilizer 602 includes a tamper detector 604, a USB connection 606, power and ground connections 608, and delay interrupt wires 610.

In some examples, the engine immobilizer 602 is a magnet-actuated switch that is connected to the dashboard cover, so when the dashboard cover is removed, the engine immobilizer 602 detects the separation of the magnet, indicating a potential tampering situation. The engine immobilizer 602 can be installed in different parts of a vehicle, such as the ignition or the acceleration line. For example, the engine immobilizer 602 works by deactivating the accelerator through a relay that opens the circuit and disconnects the wire for the accelerator. To bypass the engine immobilizer 602, a potential thief would need to locate the engine immobilizer 602 and reroute the accelerator line, an operation that may be difficult and take a long time.

In some examples, the USB connection 606 is for connecting to the com device. The interrupt wires 610 include relay interrupt wires for two different relays.

Several fleet managers have indicated three primary factors that have contributed to enhancing the likelihood of vehicle recovery: promptly identifying when a vehicle is being stolen, prolonging the duration required to steal a vehicle, and helping authorities arrive as soon as possible. The engine immobilizer 602 aids in preventing the vehicle from being moved, thereby helping to decelerate and potentially halt thefts.

By reducing the time required to identify a robbery and immobilizing a stationary or moving vehicle that is being robbed, authorities have a higher likelihood of arriving at the scene in a timely manner, and customers are able to recover their vehicles. The enhancement of security measures has demonstrated that customers equipped with effective immobilization systems are less likely to be targeted for robberies or are able to mitigate the occurrence of such incidents.

When a thief gains unauthorized access to a vehicle and forcibly removes the dashboard to reach the comm device 402, causing the magnets to disconnect, it is identified as a tampering, dangerous, and malicious event. In this scenario, the engine immobilizer 602 is autonomously triggered by the comm device 402 upon detecting the tampering.

The comm device 402 communicates with the engine immobilizer 602 to instruct the engine immobilizer 602 to stop the vehicle and immobilize it. This autonomous response sets this solution apart from others in the market, as it does not require remote intervention or manual execution after receiving a notification. Furthermore, there is no dependency on external commands from the server as all actions are self-contained within the comm device 402.

Thieves may attempt to bypass the engine immobilizer 602, but this requires significant effort as it involves removing the dashboard. In some regions, professional thieves may still find ways to re-mobilize the vehicle, but the added complexity can act as a deterrent. Companies benefit from increased recovery time for stolen vehicles and discourage thieves by making re-mobilization more challenging. Even if the thieves manage to disconnect the comm device 402, the immobilization command will still be executed. This means that the vehicle will remain immobilized even if the comm device 402 is disconnected.

Figure 7:
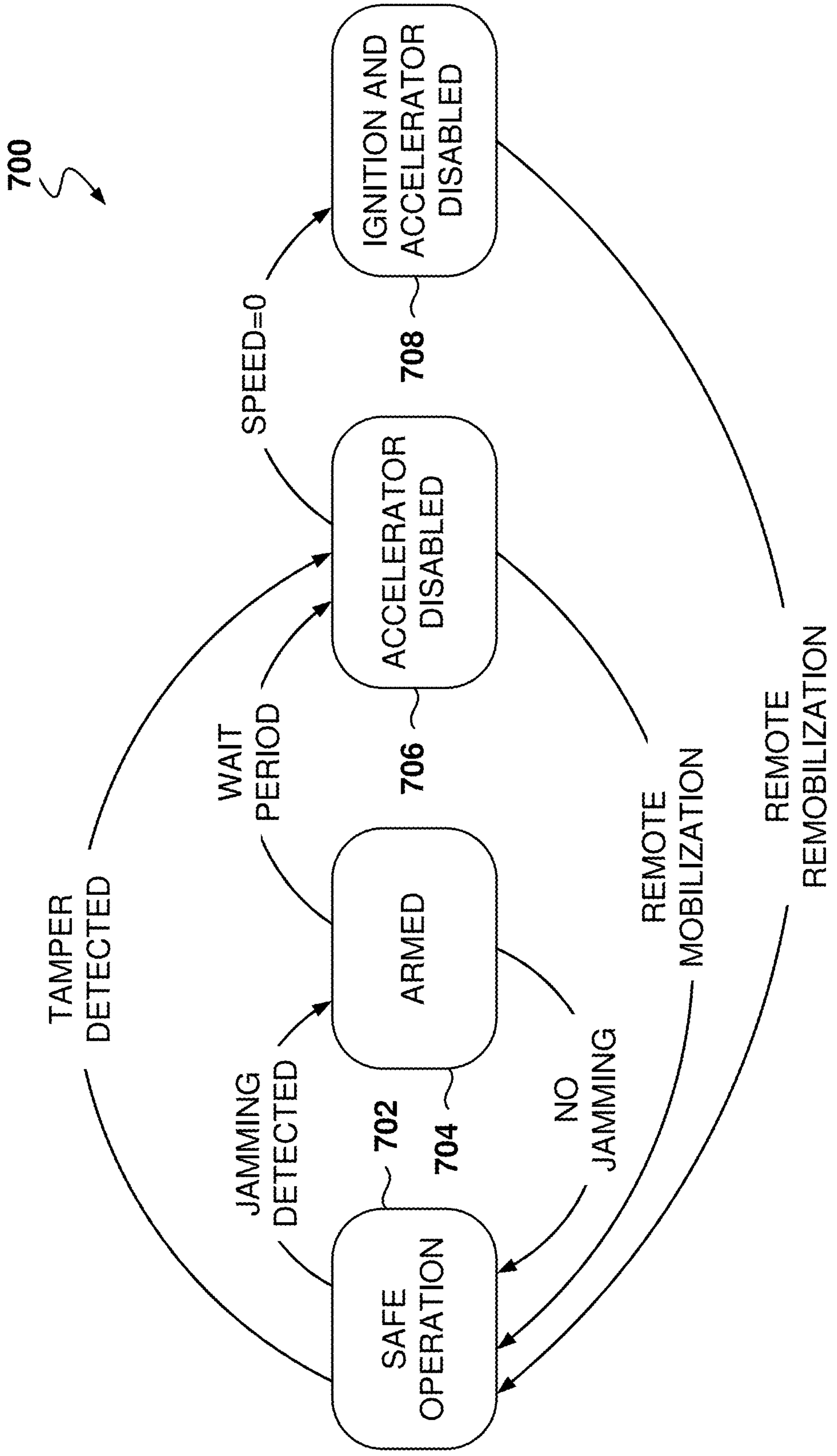
FIG. 7 is a state diagram showing tampering and jamming states, according to some examples.

FIG. 7 is a state diagram 700 showing tampering and jamming states, according to some examples. It is noted that the examples illustrated in FIG. 7 do not describe every possible implementation. Other examples may utilize different states, different conditions for transitioning between states, etc. The examples illustrated in FIG. 7 should therefore not be interpreted to be exclusive or limiting, but rather illustrative.

There are various scenarios to consider regarding customizable logic related to the activation of safety mechanisms in the vehicle. In one scenario, the speed of the vehicle is a safety concern, where the vehicle should not be immobilized unless the vehicle speed is zero or very low (e.g., less than 5 or 10 mph). In some examples, the activation of the relays will be delayed until the vehicle speed reaches zero and a specific amount of time has passed.

In a theft scenario, if a thief realizes that the relays will not engage unless the vehicle slows down, they may choose to continue driving without stopping. However, after a certain period, it may be necessary to override the safety measures and activate one or more relays to immobilize the vehicle. This logic requires careful consideration and implementation to ensure the safety and security of the vehicle.

The state diagram 700 depicts various states through which the security system can transition based on certain conditions or inputs. The state 702 is for safe operation, which indicates normal vehicle operation without any security breaches detected.

If jamming is detected while at the state 702, the system transitions to a state 704, referred to as an armed state, indicating that jamming has been detected. If the end of the jamming condition is detected (e.g., no jamming currently), then the system transitions back from the state 704 to the state 702.

Further, if the system remains at the armed state 704 for a predefined wait time (e.g., 10 minutes), then the system transitions to the state 706, referred to as accelerator disabled, where the accelerator of the vehicle is disabled, e.g., the driver cannot use the accelerator, and as a result, the vehicle will slow down until it stops or moves at a very low speed (e.g., less than ten miles an hour). The benefit of the wait time before immobilizing the vehicle after detecting jamming is to reduce the number of false positives where some signal may interfere with the GPS signal and may be interpreted as jamming, while there may be other reasons for the loss of the GPS signal. If the jamming conditions remain for the wait period, then the system will proceed to immobilize the vehicle.

While at the state 706, when the speed of the vehicle is detected below a predetermined threshold (e.g., 5 miles an hour, 0 miles an hour), then the system transitions to a state 708, referred to as ignition and accelerator disabled, where both the ignition and the accelerator are disabled to immobilize the vehicle.

In some examples, a one-time passcode may be used to re-mobilize the vehicle. In case immobilization has happened and it occurs in a zone with no signal, if a driver needs to continue operations, there is no way to remobilize the vehicle after the allotted remobilization time has passed. In this scenario, an override command that could communicate from the driver app to the com device (e.g., sent via Bluetooth) that overrides the immobilization and re-mobilizes the vehicle would be helpful to avoid delays in operations or dangerous situations.

The state 706 and the state 708 are maintained until a remote mobilization command is received, which causes the system to transition back to the safe operation state 702.

Further, while the system is at the state 702, if tamper is detected (e.g., dashboard cover is removed), then the system transitions to the state 706, where the accelerator is immobilized.

Thus, the comm device 402 recognizes certain conditions and triggers a command to the engine immobilizer to open its relays (aka immobilize the vehicle) without requiring human input.

In some examples, a timer may be used to prompt, in the BMS UI, the re-mobilization process in the event of auto immobilization. This involves closing the relay to allow the vehicle to resume movement after a specified duration.

In some examples, the vehicle will automatically re-mobilize after a specified period (e.g., 45 minutes), and the system will transition back to the state 702.

Auto mobilization can be inadequate in some situations, e.g., the vehicle stops at a toll booth, a checkpoint, or the entrance to a customer site. To avoid these situations, in some examples, a snooze option is provided to delay immobilization temporarily, and the snooze option is available in the BMS UI setting or the driver app.

In some examples, an option for stranger detection is configured to perform AI image recognition of the inward camera to identify whether the driver of the vehicle has changed, a secondary passenger has boarded the vehicle, or a firearm has been identified. In some examples, if the cam device detects any of these conditions, the cam device notifies the com device of the hazardous situation, and the com device will immobilize the vehicle.

In some examples, another tempering condition may be triggered when there is a vehicle door tempering. For example, some intruders may attempt to board a vehicle while in motion to take control of the vehicle. If this condition is triggered, auto-immobilization will be triggered to stop a theft from happening. The opening of the door may be detected by the com device or the cam device, and the speed of the vehicle is also available based on information from the diagnosis port or GPS information.

Figure 8:
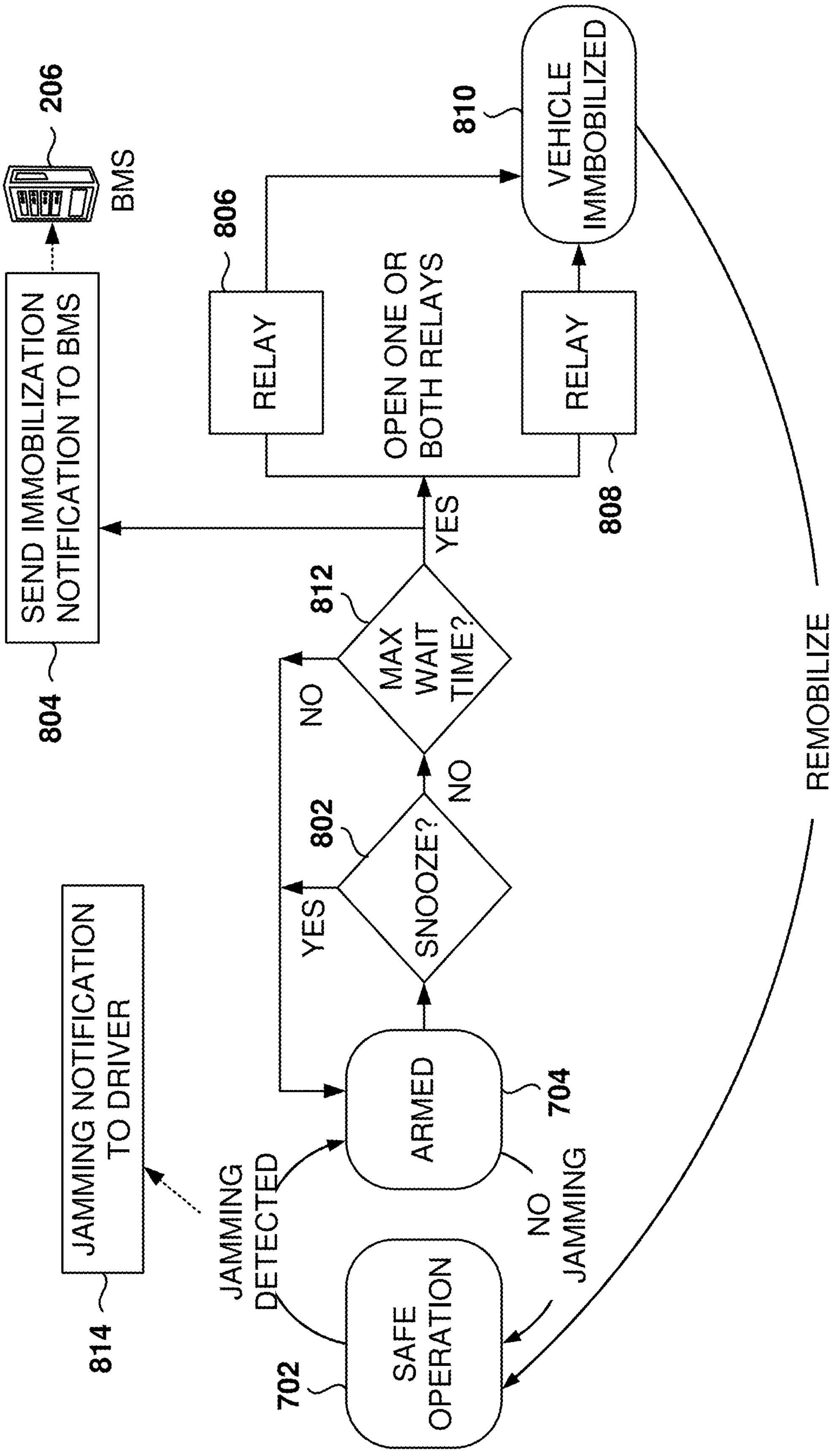
FIG. 8 illustrates the process of immobilizing the vehicle using at least one relay, according to some examples.

FIG. 8 illustrates the process of immobilizing the vehicle using at least one relay, according to some examples. FIG. 8 is an example of the operations of a vehicle security system in response to jamming detection. Although the example is presented for a jamming event, the same logic may be utilized for a tampering event.

In the BMS, the UI provides options for configuring the vehicles that will be immobilized based on jamming and other parameters, such as the duration of the armed state before the vehicle is immobilized, the duration of the immobilized state before the vehicle is remobilized, and which relays will be used to immobilize the vehicle. If both relays are configured to be activated, the user may configure the sequence of operation of the relays (e.g., deactivate the accelerator for five minutes and then cut the power). It is common practice in some geographies to open one relay to slow down the vehicle before immobilization, but there may be instances where both relays may open simultaneously due to safety protocols.

One goal is to allow the user to delay immobilization, providing the driver with the option to postpone immobilization to avoid inconvenient situations. However, there will be a configurable limit to the number of delays permitted.

The process begins at the state 702, where the system is in normal operational mode, and no jamming has been detected. Upon detection of jamming, the system transitions to the armed state 704, where the system prepares to take responsive action.

In some examples, a notification 814 is sent to the driver about the upcoming immobilization of the vehicle, but other examples may skip the notification.

A check is made at operation 802 to determine if the snooze option has been selected. The snooze option may be selected by the driver (e.g., using the driver app) or by the administrator in the BMS. If the snooze option has been selected, the system stays in the armed state; otherwise, a check is made at operation 812 to determine if a maximum wait period has been reached.

The maximum wait period is the amount of time that the system will wait after detecting jamming before the vehicle is immobilized, and the maximum wait period is configurable. If the maximum wait period is set to zero, then the system will not implement the wait period.

While the snooze option is active or the maximum wait period has not been reached, the system stays at the state 704. Once the snooze period, if triggered, and the maximum wait period are exhausted, the system will activate one or both of the relay 806 and the relay 808 according to configured values. Additionally, operation 804 is for sending an immobilization notification to the BMS 206 if possible. In some implementations, the com device is able to transmit its position even when disconnected from power (e.g., vehicle battery) because the com device has an internal battery that allows the com device to continue operating without the vehicle battery power.

In some examples, when dealing with a tampering event, the maximum wait period is set to zero, and the snooze is disabled, so the vehicle will be immobilized after detecting tampering. Tampering usually takes place while the vehicle is not moving, so immobilizing the vehicle right away will be safe without having to wait for the vehicle to slow down.

In one scenario where the vehicle is stationary, and a robbery is in progress, the objective is to immediately activate all relays available to immobilize the vehicle and prevent theft by disabling the snooze option and not implementing the wait period. Since the vehicle is not moving, there is no risk of high-speed movement or ignition.

After the relays are activated, the system transitions to state 810, where the vehicle is immobilized. The state 810 will transition back to the state 702 if the vehicle is remobilized, either because the maximum immobilization time has been reached (if configured) or a command is received to remobilize the vehicle (e.g., from the driver app if available, or from the BMS). This allows for the vehicle to be reactivated remotely once the threat has been assessed and cleared.

In some examples, a panic button is made available to the driver (e.g., a button on the cam device in the cabin, a separate button connected to the com device, an option in the driver app). If the driver activates the panic button, the vehicle will be immobilized, and a notification will be sent to the BMS 206.

In long-haul trucking applications where cellular coverage may be unavailable in certain areas, notifications may be sent via satellite communication, if available. In some cases, notifications are sent once the connection is reestablished. Even with the lack of connectivity, immobilization of the vehicle would still occur as programmed.

In cases where immobilization happens in an area with no connection, and the vehicle remains stationary without regaining connection, alerts may not be received. For these cases, the re-mobilization feature via a timer is useful so the vehicle can be automatically restarted after a configured amount of time with the expectation that the vehicle moves to an area with communication coverage to be able to track the vehicle again. Even if unauthorized individuals manage to restart the vehicle, they would be able to drive the vehicle until the connection is reestablished, at which point the vehicle could be immobilized.

Figure 9:
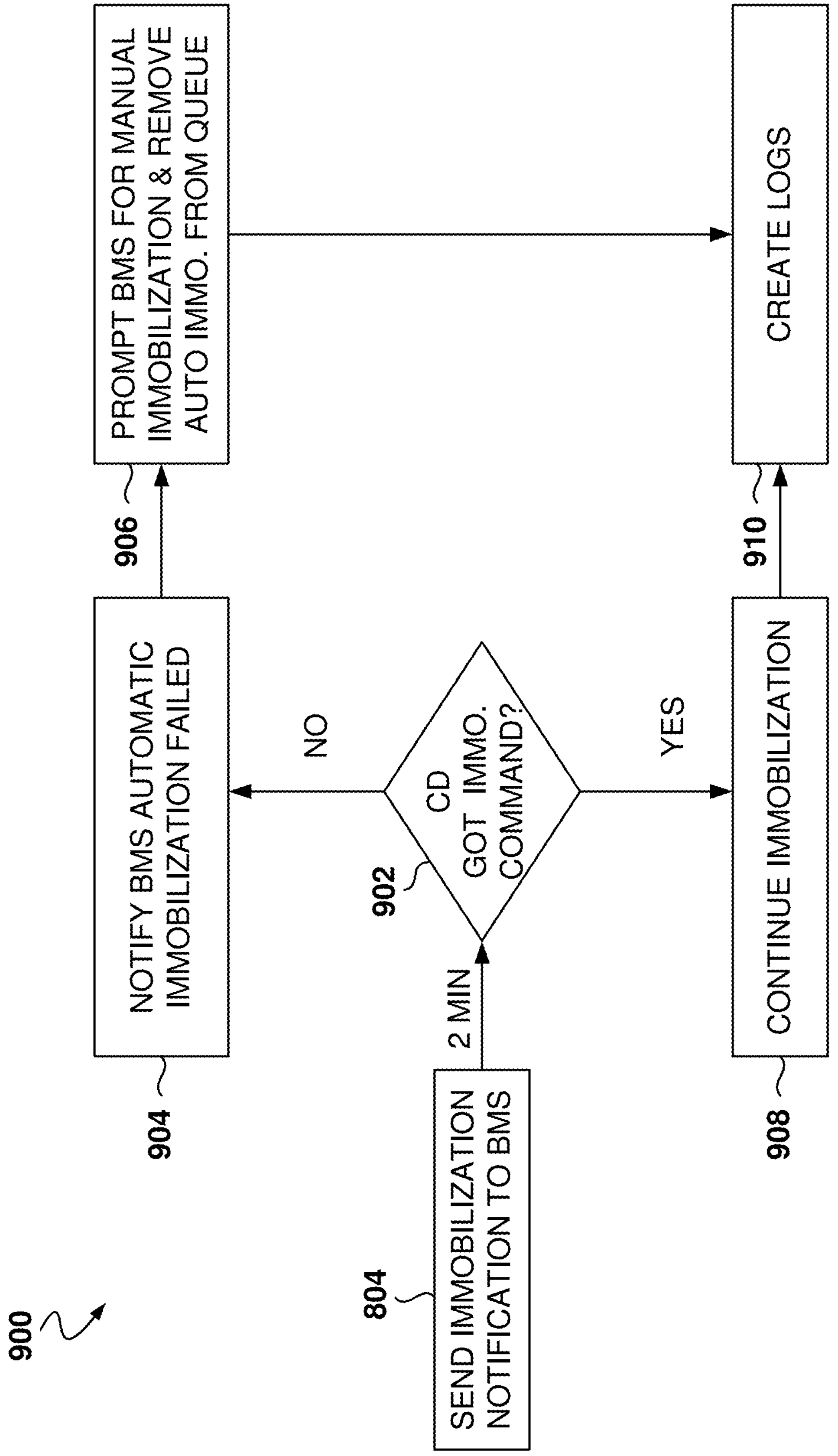
FIG. 9 is a flowchart of a method for processing immobilization events, according to some examples.

FIG. 9 is a flowchart of a method 900 for processing immobilization events, according to some examples. While the various operations in this flowchart are presented and described sequentially, one of ordinary skill will appreciate that some or all of the operations may be executed in a different order, be combined or omitted, or be executed in parallel.

Operation 804 is for sending the immobilization notification to the BMS. In order to enhance security measures for parked vehicles and provide drivers with the ability to override immobilization, the driver is notified before immobilization occurs. This notification would allow the driver to safely park the vehicle and prevent situations where immobilization could pose a risk, such as on a railroad or at a checkpoint. By granting the driver a short distance to move the vehicle after receiving the alert, the system aims to ensure safe parking practices.

From operation 902, the method 900 flows to operation 904, where a check is made to determine if the com device (CD) received the immobilization command. If the CD receives the immobilization command, the method 900 flows to operation 908, where the immobilization continues. If the CD did not receive the immobilization command, the method 900 flows to operation 904, where the BMS user is notified that the automatic immobilization failed.

From operation 904, the method 900 flows to operation 906 to prompt the BMS user to set the manual immobilization and remove the automatic immobilization from the queue that processes these commands.

From operations 906 and 908, the method 900 flows to operation 910 to create logs in the system, such as the time delta between the configuration creation and the relay open or close, failed immobilization command, etc.

In some examples, the images from the cam device can be used to automatically immobilize the vehicle based on what is detected in the cabin or on the road by analyzing the images. For example, if more than one occupant is detected in the cabin, signaling a potential security threat such as hijacking, then the immobilization process is started to immobilize the vehicle safely.

In case of an immobilization command delay and a notification to the command center that such delay has happened, a way to remove the immobilization signal from the queue should exist to avoid remote immobilization in an undesirable time or place. This queue removal can be either automatic or manual, based on the configuration option selected by the user.

Figure 10:
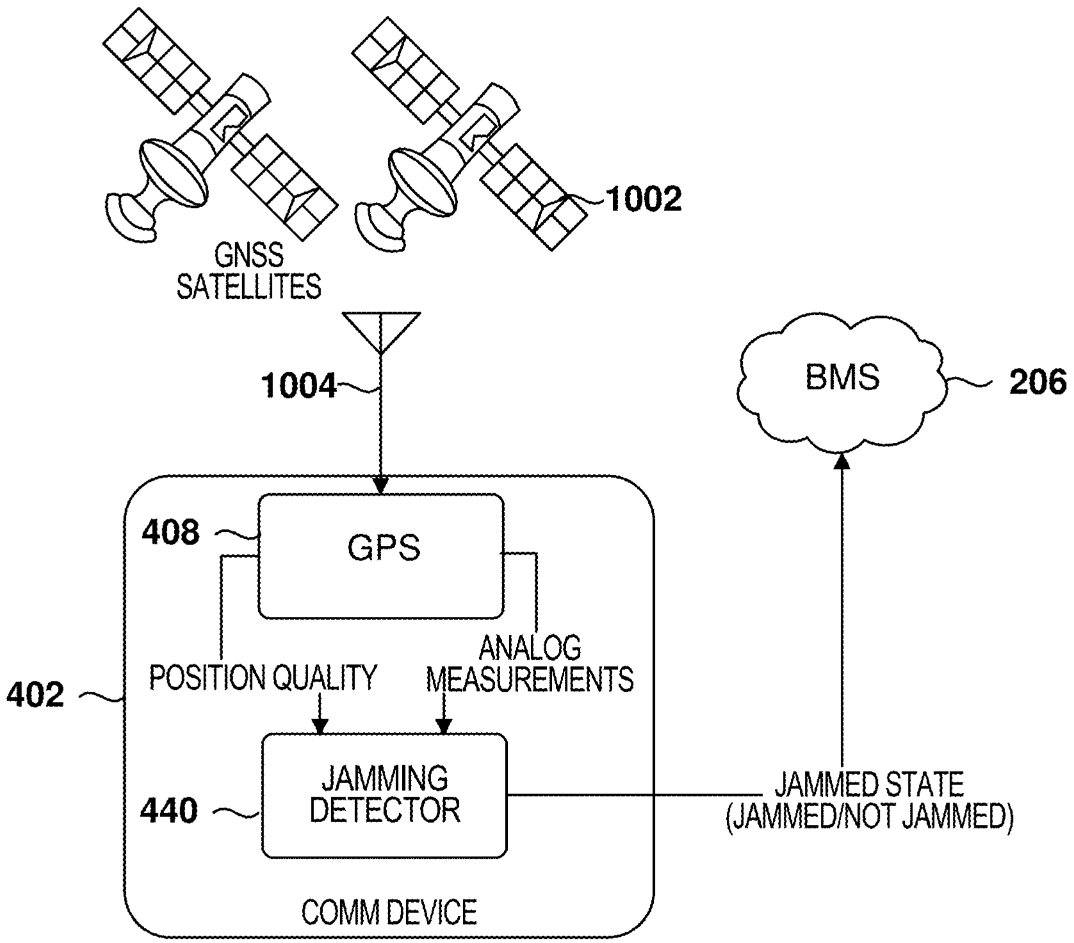
FIG. 10 illustrates the process of jamming detection, according to some examples.

FIG. 10 illustrates the process of jamming detection, according to some examples. FIG. 10 provides a schematic representation of a jamming detection system designed to identify and report jamming incidents affecting Global Navigation Satellite System (GNSS) signal reception (e.g., GPS).

The GNSS Satellites 1002 are depicted as the source of positioning signals, which are received by the GNSS Antenna 1004 of the comm device 402. The GNSS Antenna 1004 is responsible for capturing the signals transmitted by the GNSS Satellites 1002 and relaying them to the GPS 408 for processing.

Jammers emit RF noise centered on GPS frequencies to disrupt positioning systems and may utilize multiple antennas to target various radio frequencies, such as GPS, Galileo, GLONASS, and cellular bands. Advanced jammers are equipped with antennas for different systems and bands to block signals effectively.

The GPS 408 determines the position quality and analog measurements of the received signals. Within the GPS 408, the jamming detector 440 is designed to analyze the incoming GNSS signals for any anomalies or disruptions indicative of jamming activities.

The jamming detector 440 is configured to process the position quality and the analog measurements to determine the jammed state, which can be either 'jammed' or 'not jammed.' The jammed state is communicated to the BMS 206.

The BMS 206 is designed to receive the jammed state information from the comm device 402 and take appropriate action, which could include alerting users, immobilizing the vehicle, or activating other countermeasures to respond to jamming.

Figure 11:
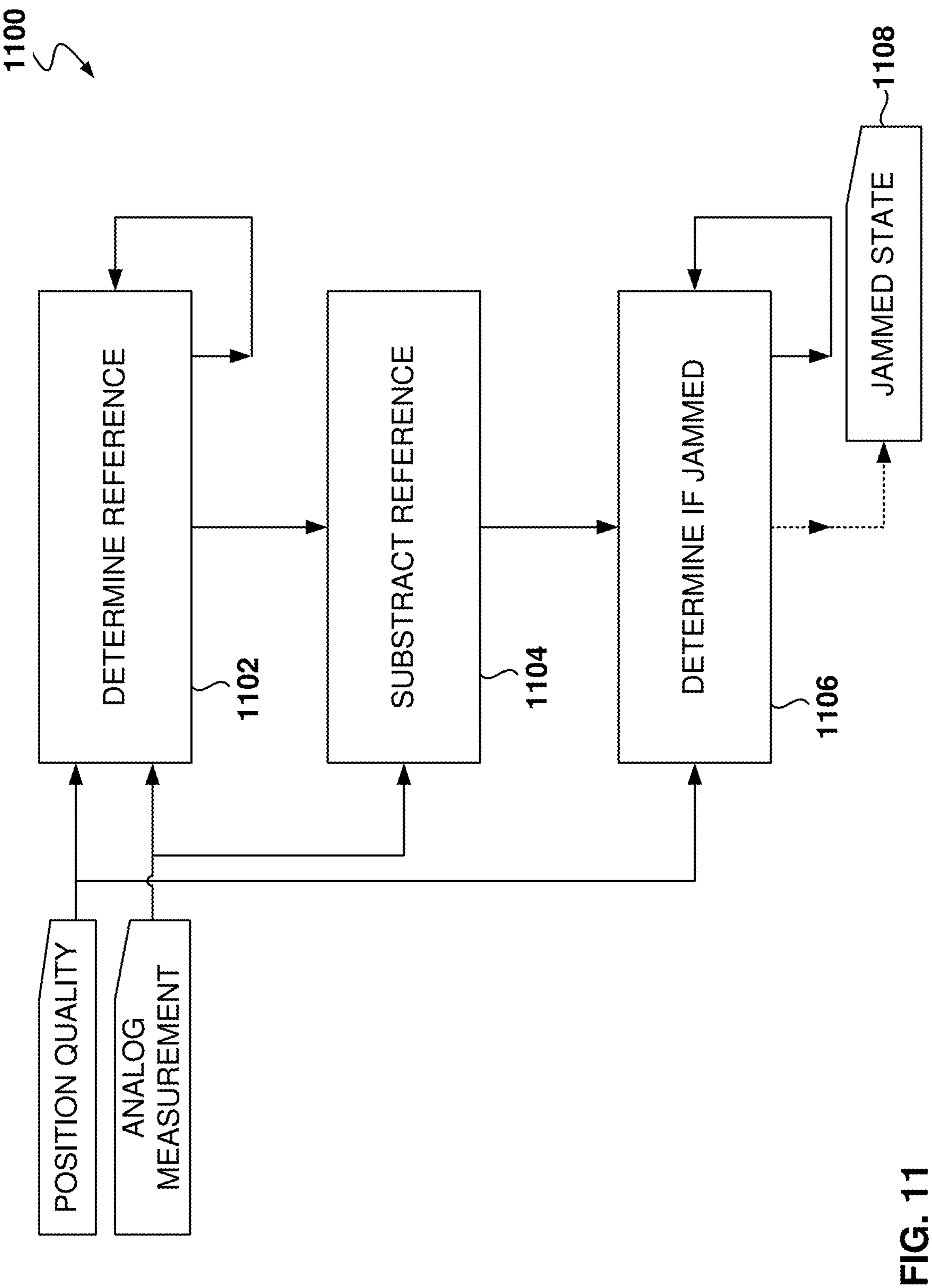
FIG. 11 illustrates the determination of the jammed state, according to some examples.

FIG. 11 illustrates the process 1100 to determine the jammed state, according to some examples. In some examples, the GNSS receiver provides noise levels that are crucial for identifying jamming activities. In this context, jamming is likened to a loud disturbance in a quiet room, where the GPS signal represents the quiet communication between devices. The receiver's function is to detect and measure this background noise, enabling the identification of jamming attempts that disrupt satellite location services.

When observing a significant increase in background noise compared to the current GPS signal, the process 1100 is applied to differentiate between jamming and other scenarios. For instance, if the GPS signal is suddenly lost, it may be the result of environmental factors like driving through a tunnel.

In some examples, the GPS module generates specific parameters, which are then analyzed by the software to interpret the various signals. In some cases, jamming may not completely block satellite signals, similar to a scenario where someone is yelling loudly enough to drown out a whisper but not loud enough to overpower normal speech. The jamming-detection system evaluates factors such as position quality, GPS fix, and analog measurements from the GPS module to determine whether jamming is occurring.

Operation 1102 is to determine the reference state based on the position quality and the analog measurements of the GPS module. The purpose of this operation is to create the reference against which subsequent measurements can be compared to detect anomalies indicative of a jam.

Following operation 1102, the process 1100 proceeds to operation 1104 to subtract the reference, which involves the subtraction of the previously determined reference from current measurements to obtain a normalized measurement value.

Operation 1106 is for determining the jamming state 1108 based on the normalized measurement value and the current position quality, where the system determines whether the deviation of the measurements exceeds a predefined threshold that would indicate a jammed condition. The goal is to determine data changes from the time that the GPS data was considered a good signal. If a jammed state is detected, the system may trigger an alert or initiate corrective actions.

Figure 12:
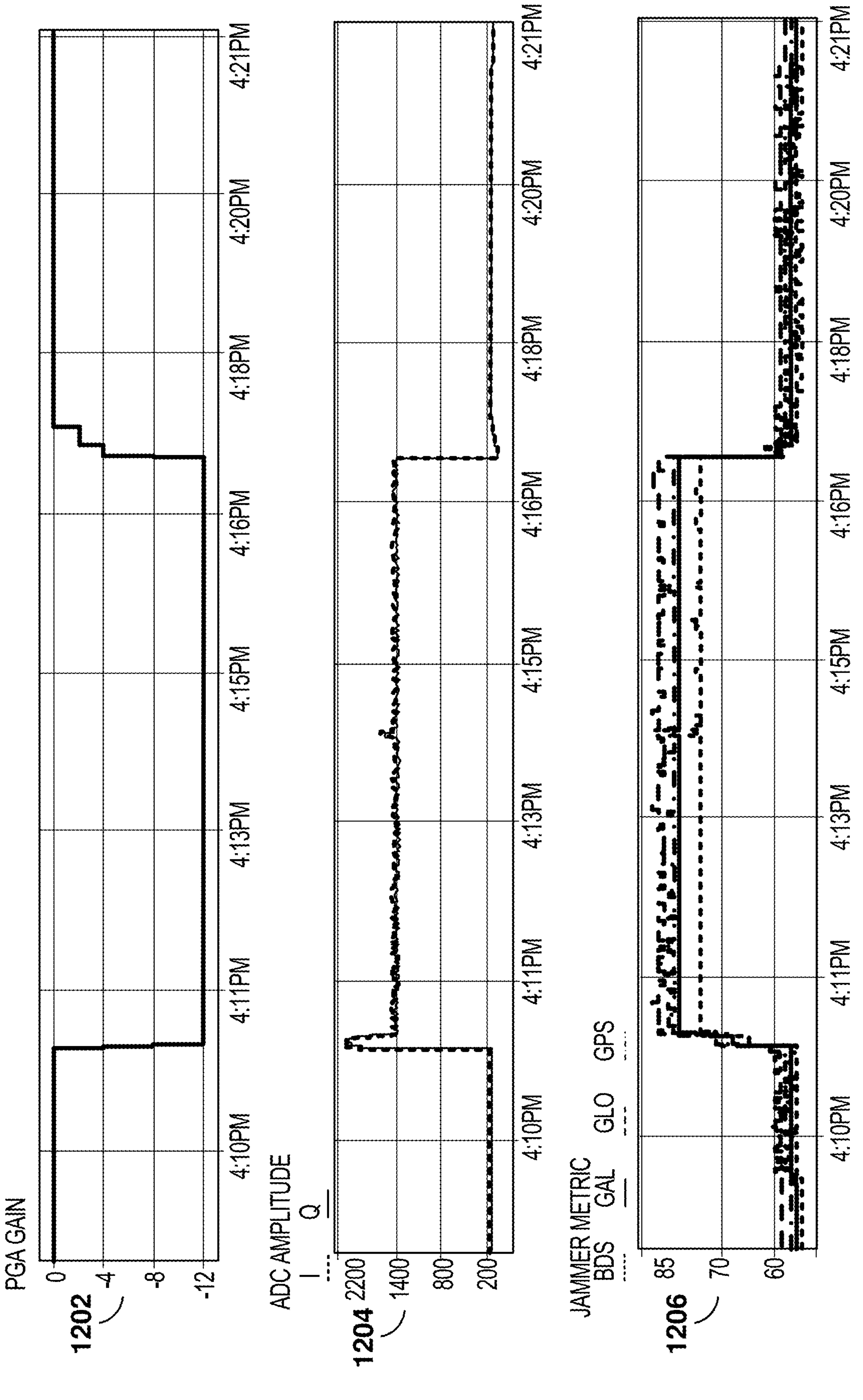
FIG. 12 shows the signals analyzed for detecting jamming events, according to some examples.

FIG. 12 shows the signals analyzed for detecting jamming events, according to some examples. The graph 1202 shows the Programmable Gain Amplifier (PGA) gain over time (horizontal axis). The vertical axis represents the gain in decibels (dB). The GPS signals received from satellites are typically very weak by the time they reach the receiver. The PGA helps amplify these signals to a suitable level for further processing without introducing excessive noise. The strength of the GPS signal can vary due to several factors, such as satellite geometry, atmospheric conditions, and obstructions. The PGA allows the receiver to adapt to these varying signal conditions, maintaining optimal performance.

Further, by adjusting the gain, the PGA helps to keep the signal within the optimal range of the Analog-to-Digital Converter (ADC). This balance is crucial because too little gain can make the signal too weak to detect accurately, while too much gain can cause the signal to become noisy and distorted.

In the illustrated example, the graph 1202 displays a step-like function where the gain decreases between 4:11 PM and 4:16 PM and afterward returns to the normal level.

The graph 1204 shows the Analog-to-Digital Converter (ADC) amplitude. It contains two traces representing the amplitude of the components I and Q, referring to the in-phase and quadrature components of the GPS signal. The ADC refers to the range of signal levels that the ADC can accurately convert from an analog signal to a digital signal. The horizontal axis is again a timeline with the same time scale as the graph 1202, while the vertical axis represents the amplitude of the I and Q signals, which, in this example, overlap.

The I component represents the part of the signal that is in phase with the local oscillator's reference signal. It captures the signal's amplitude and phase information, which is directly aligned with the reference carrier. The Q component represents the part of the signal that is 90 degrees out of phase (or in quadrature) with the reference signal. It captures the signal's amplitude and phase information that is orthogonal to the I component.

In the illustrated example, the I and Q signals are also a step function with the same interval as the step function above, showing a rise and fall of the signals between 4:11 PM and 4:16 PM.

The graph 1206 includes four traces of jammer metrics for position systems: BDS (BeiDou Navigation Satellite System), GAL (Galileo), GLO (GLONASS), and GPS, each corresponding to a different satellite navigation system. The horizontal axis is consistent with the above graphs, and the vertical axis likely represents the strength of the signals used to determine jamming interference. As in the previous graphs, there is a step variation of the positioning signals for the same interval as above.

In the context of analyzing data from radio signals, a key parameter to consider is the concept of gain, which can be likened to volume. An unusual scenario to watch out for is when the volume decreases while the signal's amplitude increases, indicating a potentially high-powered source of RF energy nearby. This situation, where lowering the volume results in a louder signal, suggests the presence of strong RF energy, contrary to typical GPS operation.

The jammer metric serves as a relative noise indicator, representing a ratio comparing current noise levels to a reference point in the past where the signal was considered good. For example, when changes between the good GPS signal and the current GPS signal exceed a threshold (e.g., changes in noise levels greater than 10 dB), potential jamming activity is assumed.

The jamming parameters are configurable, such as the adjustment of the relative change in the noise level, which is a parameter that can be modified. In some examples, the default value is 10 decibels, but it may be adjusted to meet specific requirements. The option to enable or disable the need for a loss of fix to indicate jamming is also configurable. Similarly, the ability to toggle the examination of the gain level is provided.

Figure 13:
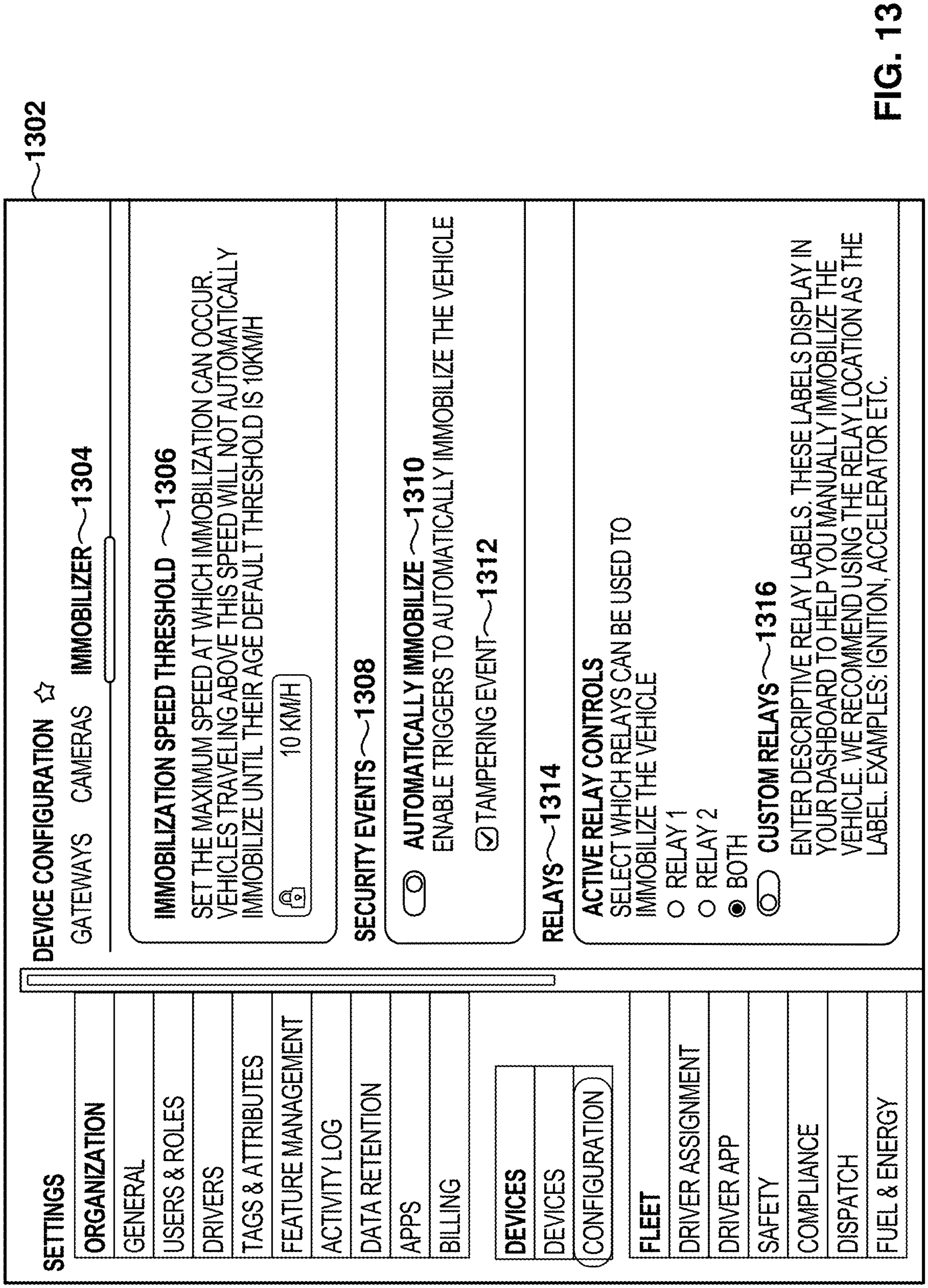
FIG. 13 is a user interface (UI) for configuring engine immobilization, according to some examples.

FIG. 13 shows UI 1302 for configuring engine immobilization, according to some examples. The UI includes various elements that allow a user to customize settings related to a vehicle's immobilization.

At the top of the UI 1302, there is a settings header on the left that indicates the current section of the UI, which is "Device Configuration." On the right side of the UI 1302, the device configuration parameters are presented, including options for Gateways, Cameras, and the selection option 1304 for the immobilizer.

Section 1306 is for the immobilization speed threshold, which includes a field for configuring the maximum speed at which immobilization can occur. This option may be blocked (as in the shown example) when the maximum speed is not configurable or when the vehicle operates in a geography where the immobilization is disabled while the vehicle is moving. The UI 1302 provides a note explaining that vehicles traveling above this speed will not automatically immobilize until their speed drops below the threshold.

Section 1308 is for security events and includes a toggle switch 1310 labeled automatically immobilize, which, when activated, enables triggers to immobilize the vehicle automatically. Below the toggle switch 1310, an option 1312 is presented for enabling or disabling immobilization contemporary is detected.

Further down, section 1314 is for configuring the relay parameters. The section 1314 options for activating the relay controls, which allow the user to select which relays can be used to immobilize the vehicle. Options include "Relay 1," "Relay 2," or "Both."

Further, the field 1316 is for custom relays, where the user can enter descriptive relay labels. These labels are intended to be displayed in the user's dashboard to assist in manually immobilizing the vehicle. The UI suggests using the relay location as the label and provides examples such as "ignition" and "accelerator."

The UI is designed to provide a user-friendly experience for configuring engine immobilization settings, with clear labels, information fields, and options that allow for easy customization according to the user's preferences and requirements.

The UI 1302 may include additional options for the configuration of immobilization parameters. In some examples, an option is provided to allow the administrator to specify how long the vehicle will be immobilized. The user may change the system default (e.g., 45 minutes) to a different value.

In some examples, an additional checkbox is presented to enable immobilization for jamming events, with the associated jamming configurable parameters, such as the period of jamming required before the vehicle is immobilized.

In some examples, an option is provided to control the duration of the jamming detection before triggering immobilization. The user may use the system default (e.g., 10 minutes) or configure a custom value.

It is noted that the administrator may configure the immobilization parameters for the whole fleet or for each individual vehicle in the fleet. For example, the administrator may select to enable immobilization in some vehicles and not in others. For example, some companies may need immobilization due to contractual and insurance agreements; some may only need specific routes to have this functionality, and that is why the BMS enables granular control of which vehicles enable auto-immobilization.

In some examples, another option is provided to allow the driver control over the immobilization feature via the driver app or a panic button. If the driver is enabled to trigger immobilization, the driver will be able to immobilize the vehicle under duress.

Further, the BMS UI includes a safety inbox where users receive notifications of events associated with the monitoring of the BMS. In some examples, the jamming and tampering events are sent to the safety inbox of one or more administrators. In some examples, if the cam device is installed in the vehicle, a video of the event is also included in the notifications. For example, the video may cover the view of the cabin and the view of the road ten minutes before and after the security event was detected.

Further, the BMS UI provides an option to remobilize a vehicle that has been immobilized. Selecting this option will cause the BMS to send a command to the com device to end the immobilization.

Figure 14:
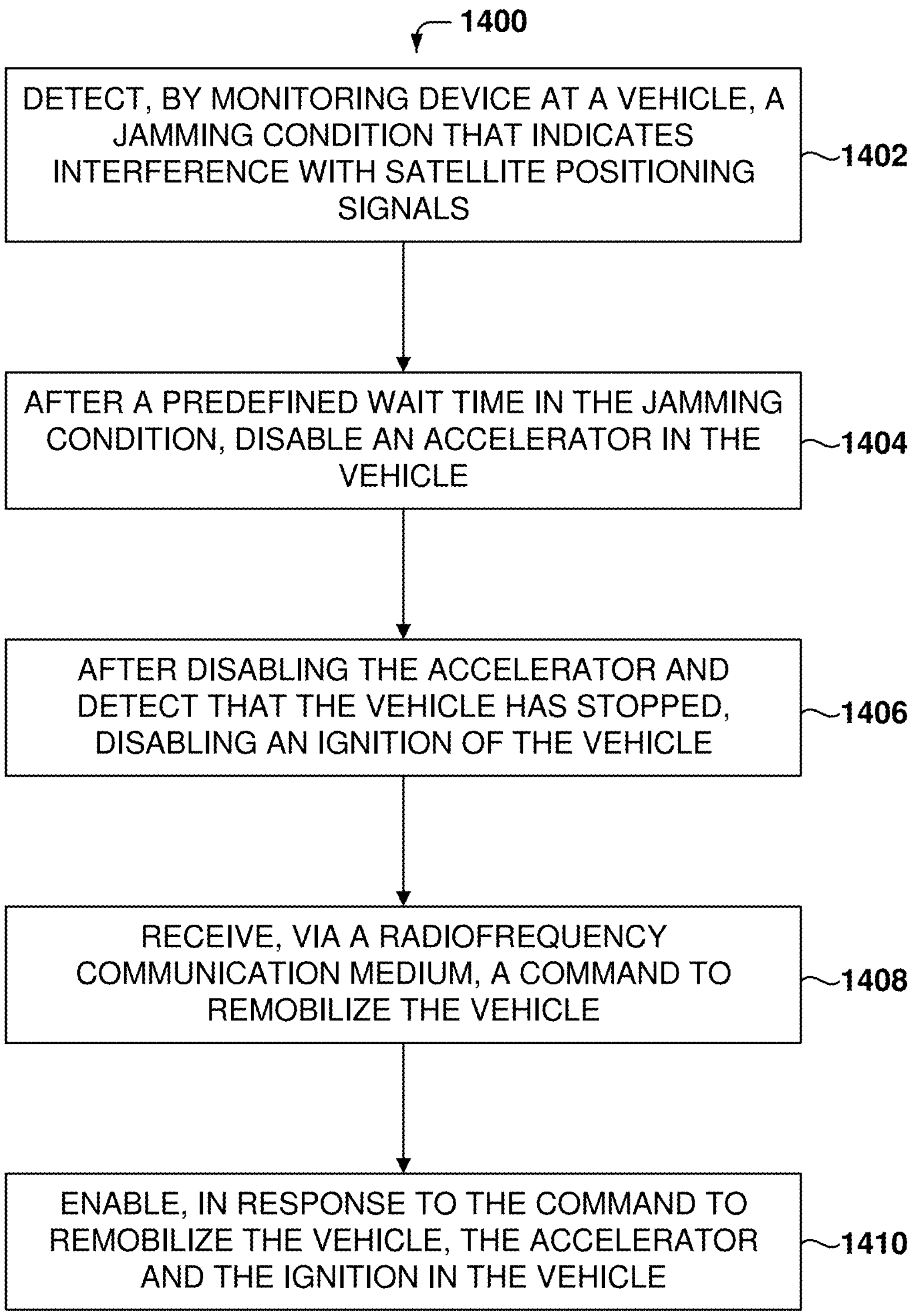
FIG. 14 is a flowchart of a method for immobilizing a vehicle based on the detection of threats, according to some examples.

FIG. 14 is a flowchart of a method 1400 for immobilizing a vehicle based on the detection of threats, according to some examples. While the various operations in this flowchart are presented and described sequentially, one of ordinary skill will appreciate that some or all of the operations may be executed in a different order, be combined or omitted, or be executed in parallel.

Operation 1402 is for detecting, by monitoring the device at a vehicle, a jamming condition that indicates interference with satellite positioning signals.

From operation 1402, the method 1400 flows to operation 1404, where after a predefined wait time in the jamming condition, an accelerator in the vehicle is disabled.

After disabling the accelerator and detecting that the vehicle has stopped, at operation 1406, an ignition of the vehicle is disabled.

From operation 1406, the method 1400 flows to operation 1408 for receiving, via a radiofrequency communication medium, a command to remobilize the vehicle.

From operation 1408, the method 1400 flows to operation 1410 for enabling, in response to the command to remobilize the vehicle, the accelerator and the ignition in the vehicle.

In some examples, the method 1400 further comprises detecting, by the monitoring device at the vehicle, tampering in the vehicle based on the removal of a dashboard cover of a location where the monitoring device is installed; and, in response to detecting the tampering, disabling the accelerator and the ignition of the vehicle.

In some examples, the tampering is detected by an engine immobilizer with a connection to the dashboard cover.

In some examples, detecting the jamming condition further comprises obtaining a position quality parameter and an analog measurement from a GPS module, calculating a difference between the analog measurement and a reference analog measurement obtained by the GPS module, and determining the jamming condition based on the difference and the position quality parameter.

In some examples, disabling the accelerator further comprises sending a request from the monitoring device to an engine immobilizer to activate a relay of the engine immobilizer that disables the accelerator of the vehicle.

In some examples, disabling the ignition in the vehicle further comprises sending a request from the monitoring device to an engine immobilizer to activate a relay of the engine immobilizer that disables the ignition in the vehicle.

In some examples, the method 1400 further comprises providing a user interface (UI) with options to configure immobilization parameters for the vehicle, the options comprising an immobilization speed threshold, automatic vehicle immobilization enabled or disabled, and operation of relays on an engine immobilizer in the vehicle.

In some examples, the method 1400 further comprises, in response to receiving selections of the immobilization parameters in the UI, sending information on the immobilization parameters to the monitoring device at the vehicle.

In some examples, the method 1400 further comprises sending, from the monitoring device to a server, a notification that the accelerator has been disabled.

In some examples, the notification includes video data of a cabin in the vehicle and the road in front of the vehicle.

Another general aspect is for a system that includes a memory comprising instructions and one or more computer processors. The instructions, when executed by the one or more computer processors, cause the one or more computer processors to perform operations comprising: detecting, by monitoring device at a vehicle, a jamming condition that indicates interference with satellite positioning signals; after a predefined wait time in the jamming condition, disabling an accelerator in the vehicle; after disabling the accelerator and detecting that the vehicle has stopped, disabling an ignition of the vehicle; receiving, via a radiofrequency communication medium, a command to remobilize the vehicle; and enabling, in response to the command to remobilize the vehicle, the accelerator and the ignition in the vehicle.

In yet another general aspect, a tangible machine-readable storage medium (e.g., a non-transitory storage medium) includes instructions that, when executed by a machine, cause the machine to perform operations comprising: detecting, by monitoring device at a vehicle, a jamming condition that indicates interference with satellite positioning signals; after a predefined wait time in the jamming condition, disabling an accelerator in the vehicle; after disabling the accelerator and detecting that the vehicle has stopped, disabling an ignition of the vehicle; receiving, via a radiofrequency communication medium, a command to remobilize the vehicle; and enabling, in response to the command to remobilize the vehicle, the accelerator and the ignition in the vehicle.

Figure 15:
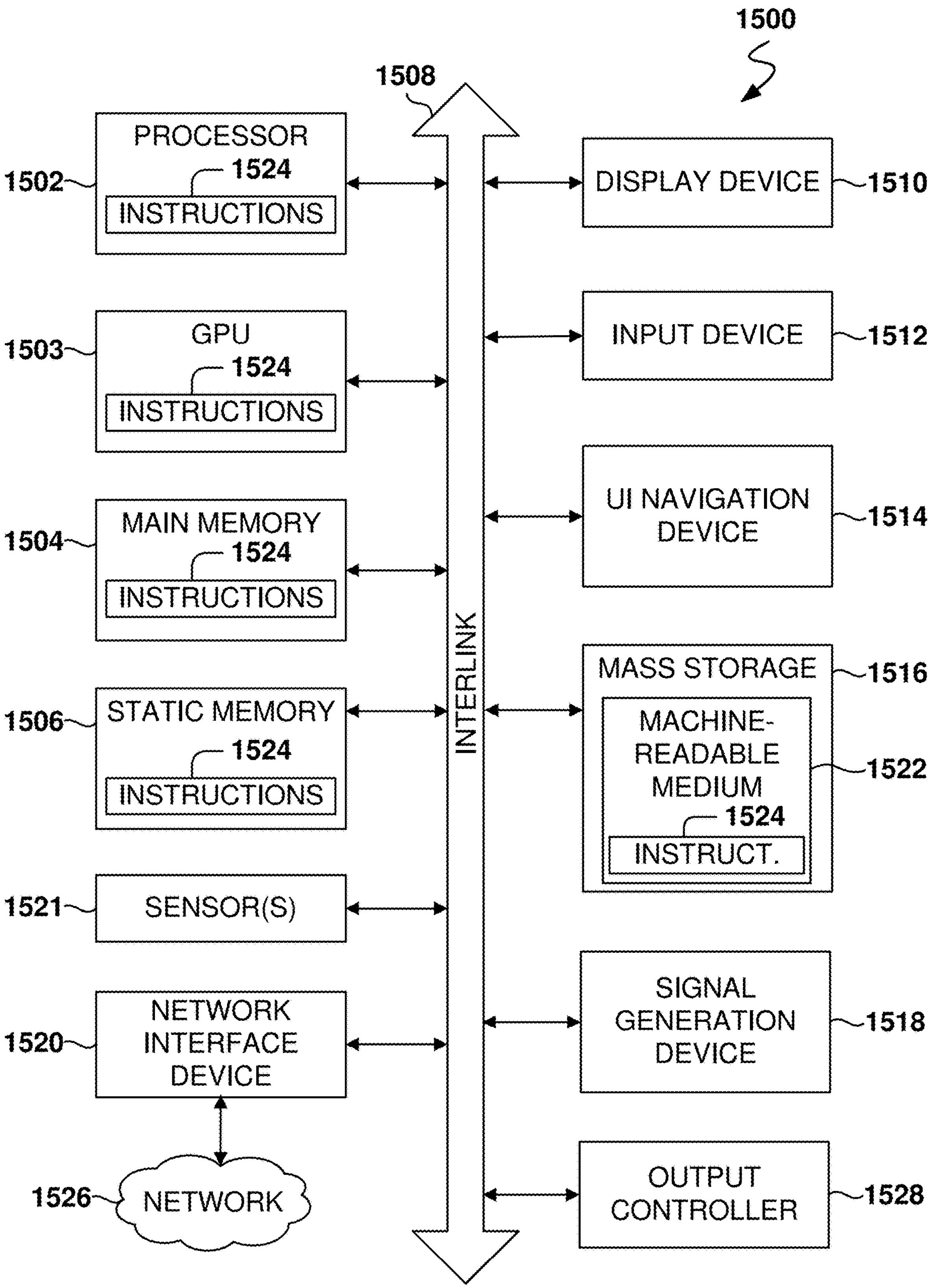
FIG. 15 is a block diagram illustrating an example of a machine upon or by which one or more example process examples described herein may be implemented or controlled.

FIG. 15 is a block diagram illustrating an example of a machine 1500 upon or by which one or more example process examples described herein may be implemented or controlled. In alternative examples, the machine 1500 may operate as a standalone device or be connected (e.g., networked) to other machines. In a networked deployment, the machine 1500 may operate in the capacity of a server machine, a client machine, or both in server-client network environments. In an example, the machine 1500 may act as a peer machine in a peer-to-peer (P2P) (or other distributed) network environment. Further, while only a single machine 1500 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1500 (e.g., computer system) may include a hardware processor 1502 (e.g., a central processing unit (CPU), a hardware processor core, or any combination thereof), a graphics processing unit (GPU 1503), a main memory 1504, and a static memory 1506, some or all of which may communicate with each other via an interlink 1508 (e.g., bus). The machine 1500 may further include a display device 1510, an alphanumeric input device 1512 (e.g., a keyboard), and a user interface (UI) navigation device 1514 (e.g., a mouse). In an example, the display device 1510, alphanumeric input device 1512, and UI navigation device 1514 may be a touch screen display. The machine 1500 may additionally include a mass storage device 1516 (e.g., drive unit), a signal generation device 1518 (e.g., a speaker), a network interface device 1520, and one or more sensors 1521, such as a Global Positioning System (GPS) sensor, compass, accelerometer, or another sensor. The machine 1500 may include an output controller 1528, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1502 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1502 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1502 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1502 may be emulated in software, running on a physical processor, as a virtual processor or virtual circuit. The virtual processor may behave like an independent processor but is implemented in software rather than hardware.

The mass storage device 1516 may include a machine-readable medium 1522 on which one or more sets of data structures or instructions 1524 (e.g., software) embodying or utilized by any of the techniques or functions described herein. The instructions 1524 may also reside, completely or at least partially, within the main memory 1504, within the static memory 1506, within the hardware processor 1502, or the GPU 1503 during execution thereof by the machine 1500. For example, one or any combination of the hardware processor 1502, the GPU 1503, the main memory 1504, the static memory 1506, or the mass storage device 1516 may constitute machine-readable media.

While the machine-readable medium 1522 is illustrated as a single medium, the term "machine-readable medium" may include a single medium or multiple media (e.g., a centralized or distributed database and associated caches and servers) configured to store one or more instructions 1524.

The term "machine-readable medium" may include any medium that is capable of storing, encoding, or carrying instructions 1524 for execution by the machine 1500 and that causes the machine 1500 to perform any one or more of the techniques of the present disclosure or that is capable of storing, encoding, or carrying data structures used by or associated with such instructions 1524. Non-limiting machine-readable medium examples may include solid-state memories and optical and magnetic media. For example, a massed machine-readable medium comprises a machine-readable medium 1522 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1524 may be transmitted or received over a communications network 1526 using a transmission medium via the network interface device 1520.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:

detecting, by a monitoring device at a vehicle, a security event indicating malicious activity in the vehicle, wherein the malicious activity comprises a jamming signal generated outside the vehicle or tampering in the vehicle by removing a dashboard cover where the monitoring device is installed;

in response to the detected security event, activating an immobilizer in the vehicle to disable an engine in the vehicle;

sending, by the monitoring device at the vehicle to a server, a notification that the vehicle has been immobilized;

receiving, from the server via a radiofrequency communication medium, a command to remobilize the vehicle; and deactivating, in response to the command to remobilize the vehicle, the immobilizer in the vehicle.

2. The method as recited in claim 1, wherein the security event is the jamming signal, the jamming signal interfering with satellite positioning signals.

3. The method as recited in claim 1, wherein the security event is tampering in the vehicle.

4. The method as recited in claim 1, further comprising:

before activating the immobilizer, sending a notification to a driver of the vehicle.

5. The method as recited in claim 1, wherein detecting the security event comprises:

analyzing images of the vehicle for a cabin of the vehicle and a road ahead of the vehicle; and determining the security event based on the analyzed images.

6. The method as recited in claim 5, wherein analyzing the images of the vehicle comprises:

detecting that there is more than one occupant in the cabin of the vehicle to detect the security event.

7. The method as recited in claim 1, wherein activating the immobilizer further comprises:

disabling an accelerator and an ignition of the vehicle.

8. The method as recited in claim 1, further comprising:

providing a user interface (UI) with options to configure immobilization parameters for the vehicle, the options comprising an immobilization speed threshold, automatic vehicle immobilization enabled or disabled, and operation of relays on the immobilizer in the vehicle.

9. The method as recited in claim 8, further comprising:

in response to receiving selections of the immobilization parameters in the UI, sending information on the immobilization parameters to the monitoring device at the vehicle.

10. A computer-implemented method comprising:

detecting, by a monitoring device at a vehicle, a security event indicating malicious activity in the vehicle;

in response to the detected security event, activating an immobilizer in the vehicle to disable an engine in the vehicle;

sending, to a server, a notification that the vehicle has been immobilized;

receiving, from the server via a radiofrequency communication medium, a command to remobilize the vehicle;

deactivating, in response to the command to remobilize the vehicle, the immobilizer in the vehicle;

detecting jamming around a security checkpoint; and blocking detection of the security event based on the detecting of the jamming around the security checkpoint.

11. The method as recited in claim 10, wherein the security event is a jamming signal, the jamming signal interfering with satellite positioning signals.

12. The method as recited in claim 10, wherein the security event is tampering in the vehicle.

13. The method as recited in claim 10, further comprising:

before activating the immobilizer, sending a notification to a driver of the vehicle.

14. The method as recited in claim 10, wherein detecting the security event comprises:

analyzing images of the vehicle for a cabin of the vehicle and a road ahead of the vehicle; and determining the security event based on the analyzed images.

15. The method as recited in claim 14, wherein analyzing the images of the vehicle comprises:

detecting that there is more than one occupant in the cabin of the vehicle to detect the security event.

16. A system comprising:

a memory comprising instructions; and one or more computer processors, the instructions, when executed by the one or more computer processors, causing the system to perform operations comprising:

detecting, by a monitoring device at a vehicle, a security event indicating malicious activity in the vehicle, wherein the malicious activity comprises a jamming signal generated outside the vehicle or tampering in the vehicle by removing a dashboard cover where the monitoring device is installed;

in response to the detected security event, activating an immobilizer in the vehicle to disable an engine in the vehicle;

sending, by the monitoring device at the vehicle to a server, a notification that the vehicle has been immobilized;

receiving, from the server via a radiofrequency communication medium, a command to remobilize the vehicle; and deactivating, in response to the command to remobilize the vehicle, the immobilizer in the vehicle.

17. The system as recited in claim 16, wherein the security event is the jamming signal, the jamming signal interfering with satellite positioning signals.

18. The system as recited in claim 16, wherein the security event is tampering in the vehicle.

19. The system as recited in claim 16, wherein the instructions further cause the one or more computer processors to perform operations comprising:

before activating the immobilizer, sending a notification to a driver of the vehicle.

20. The system as recited in claim 16, wherein detecting the security event comprises:

analyzing images of the vehicle for a cabin of the vehicle and a road ahead of the vehicle; and determining the security event based on the analyzed images.

* * * * *